US008647536B2

(12) United States Patent
Russell et al.

(10) Patent No.: US 8,647,536 B2
(45) Date of Patent: Feb. 11, 2014

(54) ALUMINUM/ALKALINE EARTH METAL COMPOSITES AND METHOD FOR PRODUCING

(75) Inventors: Alan M. Russell, Ames, IA (US); Iver E. Anderson, Ames, IA (US); Hyong J. Kim, Ames, IA (US); Andrew E. Freichs, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 116 days.

(21) Appl. No.: 13/136,599

(22) Filed: Aug. 4, 2011

(65) Prior Publication Data

US 2012/0049129 A1 Mar. 1, 2012

Related U.S. Application Data

(60) Provisional application No. 61/401,266, filed on Aug. 10, 2010.

(51) Int. Cl.
*H01B 1/14* (2006.01)
*B32B 5/12* (2006.01)

(52) U.S. Cl.
USPC ........ 252/512; 428/545; 428/114; 428/293.1; 29/825; 174/104

(58) Field of Classification Search
USPC .................. 505/231; 174/102 R, 104, 128.2; 29/825; 252/512–514, 518.1; 428/545, 428/114, 293.1
See application file for complete search history.

(56) References Cited

U.S. PATENT DOCUMENTS

| | | | | |
|---|---|---|---|---|
| 3,795,042 | A * | 3/1974 | Kreider et al. | 228/190 |
| 4,200,767 | A * | 4/1980 | Nomura et al. | 174/125.1 |
| 4,839,238 | A * | 6/1989 | Nakatani et al. | 428/614 |
| 5,132,278 | A * | 7/1992 | Stevens et al. | 505/231 |
| 5,200,004 | A | 4/1993 | Verhoeven et al. | 148/527 |
| 5,330,969 | A * | 7/1994 | Finnemore et al. | 505/431 |
| 6,117,534 | A * | 9/2000 | Yamamura et al. | 428/294.1 |
| 7,794,520 | B2 * | 9/2010 | Murty et al. | 75/245 |
| 2006/0024489 | A1 * | 2/2006 | Werner et al. | 428/323 |

OTHER PUBLICATIONS

Russell, A.M., et al., A high-strength, high-conductivity Al-Ti deformation processed metal metal matrix composite, Composites: Part A, vol. 30, pp. 239-247, 1999.
Xu, K., et al., Characterization of strength and microstructure in deformation processed Al-Mg composites, Journal of Materials Science, vol. 34 (24), pp. 5955-5959, 1999.
Xu, K., et al., A deformation processed Al-20% Sn in situ composite, Scripta Materialiam vol. 44, pp. 935-940, 2001.
Xu, K., et al., Microstructure and strength of a deformation processed Al-20% Sn in situ composie, Journal of Materials Science, vol. 37(24), pp. 5209-5214, 2002.
Xu, K., et al., Texture-strength relationships in a deformation processed Al-Sn metal-metal- composite, Journal of Materials Science and Engineering A, vol. 373, No. 1-2, pp. 99-106, 2004.

* cited by examiner

*Primary Examiner* — Mark Kopec

(57) ABSTRACT

A composite is provided having an electrically conducting Al matrix and elongated filaments comprising Ca and/or Sr and/or Ba disposed in the matrix and extending along a longitudinal axis of the composite. The filaments initially comprise Ca and/or Sr and/or Ba metal or alloy and then may be reacted with the Al matrix to form a strengthening intermetallic compound comprising Al and Ca and/or Sr and/or Ba. The composite is useful as a long-distance, high voltage power transmission conductor.

35 Claims, 24 Drawing Sheets

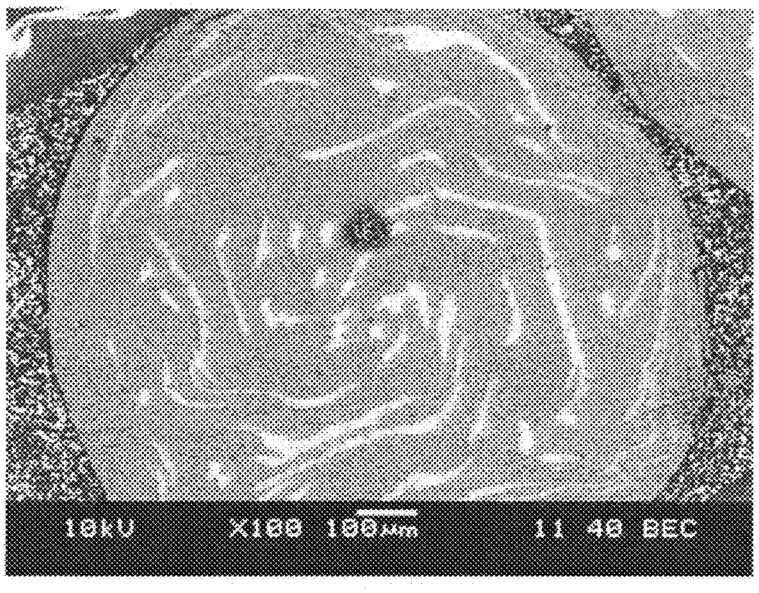
Figrue 16
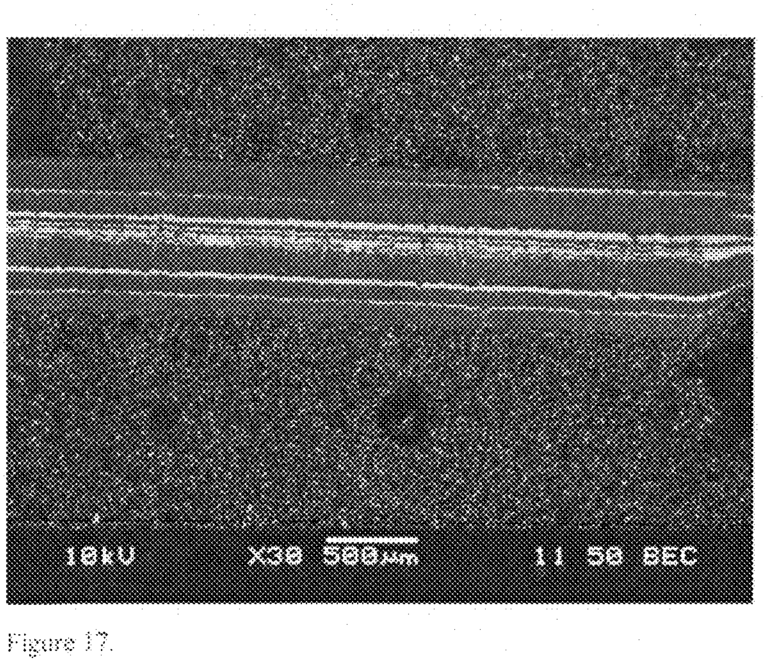
Figure 17

ALUMINUM/ALKALINE EARTH METAL COMPOSITES AND METHOD FOR PRODUCING

RELATED APPLICATION

This application claims benefits and priority of U.S. provisional application Ser. No. 61/401,266 filed Aug. 10, 2010, the entire disclosure of which is incorporated herein by reference.

CONTRACTUAL ORIGIN OF THE INVENTION

This invention was made with government support under Grant No. DE-AC02-07CH11358 awarded by the Department of Energy. The Government has certain rights in the invention.

FIELD OF THE INVENTION

The present invention relates to aluminum/alkaline earth metal composites for use in high voltage power transmission and to a method of making the metal-metal composites.

BACKGROUND OF THE INVENTION

High voltage electric power transmission cables in current use include multiple (e.g., 7) galvanized steel or stainless steel wire strands wrapped with multiple (e.g., 26) aluminum or aluminum alloy wires. A pure aluminum or aluminum alloy wire is often used as a wrapping wire around the steel core, or in some products, aluminum alloy wire may be used without a steel core. Aluminum alloys commonly used in this manner are referred to as 6201 aluminum alloy, 5005 aluminum alloy, or Al-0.3% Zr alloy. Alloy 6201 has a conductivity of $(0.31)10^6\ cm^{-1}\Omega^{-1}$ and a tensile strength of 330 MPa with poor elevated temperature strength retention over time. The strength of 5005 alloy is similar to that of 6201, but its conductivity is $(0.32)10^6\ cm^{-1}\Omega^{-1}$. Al-0.3% Zr wire has conductivity of $(0.35)10^6\ cm^{-1}\Omega^{-1}$, but its tensile strength is lower. An aluminum-$Al_2O_3$ composite wire is commercially available as ACCR wire from 3M Corporation and has a conductivity of $(0.19)10^6\ cm^{-1}\Omega^{-1}$ and a tensile strength of 310 MPa with good elevated temperature strength retention over time. The 6201 aluminum alloy wire has a cost disadvantage in that it is about 1.3 times more costly relative to pure aluminum wires. The ACCR wire has a cost disadvantage in that it is about 4.8 times more costly relative to pure aluminum wires. The densities of 6201 and 5005 alloys are similar to that of pure aluminum (2.70 g/cm$^3$); however, ACCR wire has an additional disadvantage in that its density is 3.34 g/cm$^3$, substantially higher than the density of pure aluminum.

There is a need for a new material that can provide high electrical conductivity together with high tensile strength, low density, and strength retention at elevated temperatures at reasonable cost for high voltage electric power transmission and other uses.

SUMMARY OF THE INVENTION

The present invention provides an aluminum/alkaline earth metal composite to satisfy this need. In one embodiment of the invention, the composite comprises an electrically conducting matrix comprising aluminum having elongated filaments therein, wherein the filaments comprise an alkaline earth metal such as calcium (Ca), strontium (Sr), and/or barium (Ba) and have a ribbon-like or rod-like morphology extending along its longitudinal axis. The filaments can comprise about 2 to about 40 volume % of the composite. The present invention provides high voltage electric power transmission conductors, such as cable and wire, made of the aluminum/alkaline earth metal composite.

The akaline earth metal of the filaments may be reacted partially or fully by heat treatment or by (Joule) heating in service with the aluminum of the matrix to form intermetallic strengthening compounds (e.g. $Al_2Ca$ and/or $Al_4Sr$ and/or $Al_4Ba$) that have higher strength than that of the initial Ca and for Sr and/or Ba metallic filaments to impart high strength properties while retaining high electrical conductivity of the matrix.

In a method embodiment of the invention, a mass comprising mixed Al components and Ca and/or Sr metallic and/or Ba components is provided and mechanically deformed to co-deform the components to produce the above-described composite. The Al metallic components can comprise powder particulates, granule particulates, wire lengths, rod lengths, or other forms/shapes of aluminum or an aluminum alloy. The Ca and/or Sr and/or Ba metallic components can comprise powder particulates, granule particulates, wires lengths, ribbon lengths, rod lengths, or other forms/shapes of calcium and/or strontium metal and/or barium metal or their individual or collective alloys.

In an illustrative method embodiment of the invention, aluminum powder is mixed with Ca metallic powder and/or Sr metallic powder and/or Ba, optionally compacted, and placed in a container. The container then is deformed (e.g. extruded followed by swaging and drawing with or without the container) to co-deform the component powders to an extent to provide the elongated, ribbon-shaped filaments comprising metallic Ca and/or metallic Sr and/or metallic Ba in the Al matrix and extending along the longitudinal axis of the composite.

In another illustrative method embodiment of the invention, wire or rod lengths of the aluminum precursor matrix are stacked and aligned with wire or rod lengths of Ca and/or Sr and/or Ba metal or alloy in a container with the wire or rod lengths aligned with the longitudinal axis of the container. The container then is deformed (e.g. extruded followed by swaging and drawing with or without the container) to co-deform the wire or rod lengths of the components to an extent to provide elongated, rod-shaped or ribbon-shaped filaments comprising metallic Ca and/or metallic Sr and/or metallic Ba in the Al matrix and extending along the longitudinal axis of the composite.

In the above method embodiments, the composite can be subjected to an elevated temperature (e.g., 350° C.) for a time (e.g., 4 hours) to react fully the akaline earth metal of the filaments with the aluminum of the matrix to form the aforementioned intermetallic strengthening compounds that have higher strength than that of the initial metallic filaments to provide high strength properties and good strength retention at elevated temperatures while retaining high electrical conductivity of the matrix.

Advantages of the present invention will become more readily apparent from the following detailed description taken in conjunction with the following drawings.

BRIEF DESCRIPTION OF THE DRAWINGS

FIG. 16 shows a transverse cross section of Al—Sr as-swaged (No HT) sample.

FIG. 17 shows a longitudinal cross section of Al—Sr heated at 573K for 1.33 hours

DETAILED DESCRIPTION OF THE INVENTION

Figure 1:
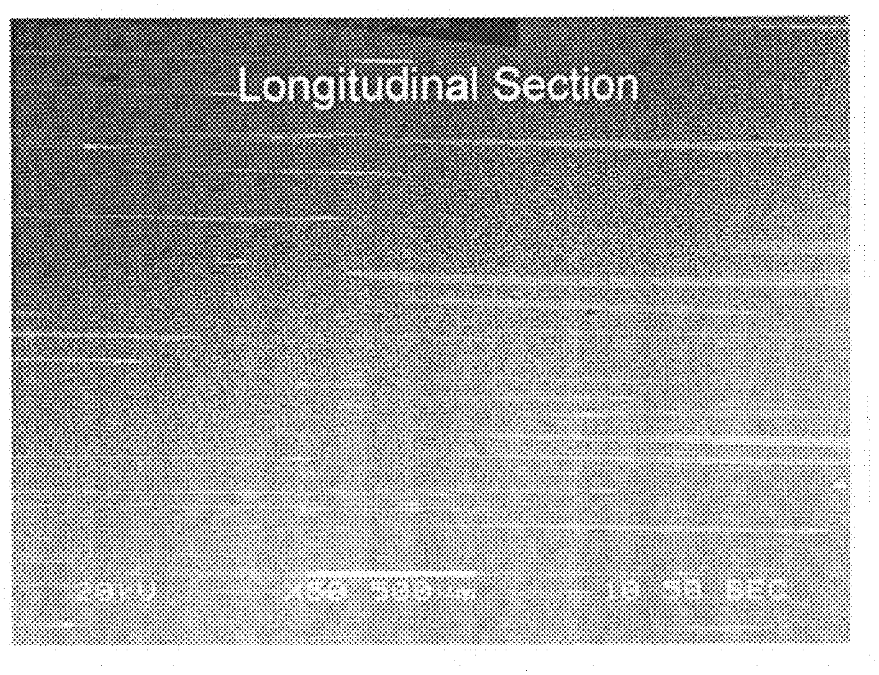
FIG. 1 is a back-scattered electron image of a longitudinal cross section of the Al-9 volume % Ca composite. The horizontal filaments (light gray) are pure Ca metal; the dark gray matrix is pure Al metal.

The present invention provides an aluminum/alkaline earth metal composite that provides desirable electrical conductivity and mechanical properties for use as a high voltage electric power transmission conductor, such as a cable or wire, and other uses where a combination of such properties is desired.

An embodiment of the invention provides a metal-metal composite that comprises an electrically conducting matrix comprising aluminum having elongated filaments comprising an alkaline earth metal, such as preferably Ca and/or Sr and/or Ba, that has substantially no solid solubility in aluminum. The filaments preferably have an elongated ribbon-shaped, rod-shaped or whorl morphology described later extending along the longitudinal axis of the composite. For a power transmission conductor (i.e., cable or wire), the filaments extend generally along the length of the conductor parallel to its longitudinal axis. The filaments can comprise about 2 to about 40 volume % of the composite. The filaments have a thickness dimension that is less than about 1 micron in order to provide a strengthening effect, especially when the metallic filaments are converted partially or fully to an intermetallic compound as described in the next paragraph.

The akaline earth metal of the filaments preferably is reacted partially or fully by heat treatment or by heating in power transmission service with the aluminum of the matrix to form intermetallic strengthening compounds comprising Al and Ca (e.g. $Al_2Ca$) and/or Sr (e.g. $Al_4Sr$) and/or Ba (e.g., $Al_4Ba$) that have higher strength than that of the initial Ca and/or Sr and/or Ba metallic filaments to provide high strength properties and particularly high strength retention at elevated temperatures while retaining high electrical conductivity of the matrix. The intermetallic compound formed by such heating can comprise an intermetallic surface layer on the filaments in an embodiment of the invention. This allows the electric power transmission composite conductor to carry power at elevated temperature such as 200 degrees C. or higher, which is a desirable capability in some power transmission grid applications.

According to a method embodiment of the invention, a mass comprising Al metallic components and alkaline earth metallic components, such as Ca and/or Sr and/or Ba, is provided and mechanically deformed in a manner to form the above-described composite. The Al metallic components can comprise powders, granules, wire lengths, rod lengths, or other forms of aluminum or an aluminum alloy. The Ca and/or Sr and/or Ba metallic components can comprise powder, granules, wires lengths, ribbon lengths, rod lengths, or other forms of calcium and/or strontium metal and/or barium metal or their individual alloys or alloys of one with the other. Both the percentage of alkaline earth metal powder and the diameter of the powder particles may be varied to achieve different combinations of strength and conductivity.

An illustrative method embodiment of the invention involves mixing aluminum powder and Ca metallic powder and/or Sr metallic powder and/or Ba metallic powder, optionally compacting the mixture, and placing the mixture (compacted mass) in a suitable container. The container then is deformed (e.g. extruded followed by swaging and drawing with or without the container) in a manner to elongate the mass of powders to an extent to provide the elongated, ribbon-shaped filaments comprising metallic Ca and/or metallic Sr and/or metallic Ba in an Al matrix and extending along the longitudinal axis of the composite. Extrusion, swaging, and drawing performed with the container still surrounding the composite has the advantage of providing a corrosion-resistant barrier around the composite to provide an additional measure of corrosion protection to the composite, such as a drawn composite cable or wire, when it will be used in a corrosive environment.

Another illustrative method embodiment of the invention involves stacking wire or rod lengths of the aluminum matrix and wire or rod lengths of Ca and/or Sr and/or Ba metal or alloy in a container with the wire or rod lengths aligned with the longitudinal axis of the container. The container then is deformed (e.g. extruded followed by swaging and drawing with or without the container) in a manner to elongate the mass of wire or rod lengths to an extent to provide elongated, rod-shaped or ribbon-shaped filaments comprising metallic Ca and/or metallic Sr and/or metallic Ba in an Al matrix and extending along the longitudinal axis of the composite. Both the percentage of alkaline earth metal wires or rods and the diameter of the wires or rods may be varied to achieve different combinations of strength and conductivity.

The alkaline earth metal of the filaments can be reacted partially or fully by heat treatment under selected temperature and time conditions with the aluminum of the matrix to form the aforementioned intermetallic strengthening compounds that have higher strength than that of the initial Ca and/or Sr and/or Ba metallic filaments to provide high strength properties, particularly high strength at elevated temperatures. These heat treatments will not greatly reduce the electrical conductivity of the composite since neither Ca, Sr, nor Ba has solid solubility in Al. The lack of any significant solid solubility of the reinforcement phase element in the aluminum matrix is an advantage of the composite of the invention since it essentially removes most of the chemical driving force for interdiffusion and reduction of the aluminum matrix conductivity. Illustrative intermetallic strengthening compounds include but are not limited to $Al_2Ca$ and/or $Al_4Sr$ and/or $Al_4Ba$. With respect to $Al_2Ca$, this compound comprises a hard Laves phase with a melting point of 1087 degrees C., which is considerably higher than that of Al (660 degrees C.) and Ca (842 degrees C.). With respect to $Al_4Sr$, this compound comprises a hard Laves phase with a melting point of 1040 degrees C. With respect to $Al_4Ba$, this compound comprises a hard Laves phase with a melting point of 1104 degrees C. The intermetallic compound formed as a surface layer on the reinforcement filaments also serves as additional protection against interdiffusion of Ca, Sr, or Ba into the Al matrix that is driven only by the propensity for entropy increase. Additionally, the strength of the interface between the matrix and reinforcement phase is greatly enhanced by the intermetallic layer formation, which greatly facilitates load sharing and composite strengthening by the much stronger intermetallic phase after heat treatment.

The mechanical deformation (reduction) process can be carried out using known mechanical size reduction processes, such as extrusion, cold or hot swaging, rod rolling, wire drawing, forging and like processes. Certain mechanical reduction processes are described in the Examples below for purposes of illustration and not limitation. A large percentage reduction in area is used in the deformation processing operation to co-deform the Al component and the alkaline earth metal component to form an "in-situ" Al-alkaline earth metal composite to a desired configuration such as wire, cable or possibly sheet and the like. Typically, the reduction in area is described in terms of the parameter $\eta$ which is equal to the natural logarithm of the ratio of the cross-sectional area of the billet (mass to be deformed) before reduction and the cross-sectional area after reduction as set forth in U.S. Pat. No. 5,200,004, which is incorporated herein by reference to this end. In general, values of the parameter $\eta$ used in practicing the invention are at least about 4 and preferably above about 9.

Heat treatment may also be conducted during service of the composite as a high voltage power transmission conductor where the conductor is resistively heated ("Joule heating" effect) by flow of electrical current therethrough.

The following EXAMPLES are offered to further illustrate but not limit the invention:

Example 1

Four powder compacts were made comprising Al-9 vol. % Ca, Al-6 vol. % Ca, Al-3 vol. % Ca, and a pure Al control specimen. The powder compacts were made using Al powder of 99.9% purity and of −200 mesh size produced by gas atomization at the Ames Laboratory of the USDOE and Ca granules of 99.9% purity and of −16 mesh size purchased from ESPICorp, Inc. The powders and granules were mixed by Turbula blender and uniaxially compacted at 35 MPa to form the individual compacts. The four compacts were piggy-backed as one billet in a container made of commercial-purity aluminum of 6 mm thickness. The container was then placed inside a large vacuum chamber, the air inside the chamber and the container was pumped away by a vacuum pump, and an end cap was welded in place to seal the contents of the container under vacuum.

The container was extruded at 285° C., converting the initial billet dimensions of 31.8 cm long×8.89 cm in diameter into a rod 4.27 m long and 2.21 cm in diameter. The extruded rod comprising the four specimens (Al-9 vol. % Ca, Al-6 vol. % Ca, Al-3 vol. % Ca, and a pure Al control specimen) was then swaged at room temperature to a diameter of 3 mm: reduction to 1 mm diameter wire was performed by wire drawing at room temperature. The composite material was quite ductile and was swaged and drawn easily without cracking or other problems.

Figure 2:
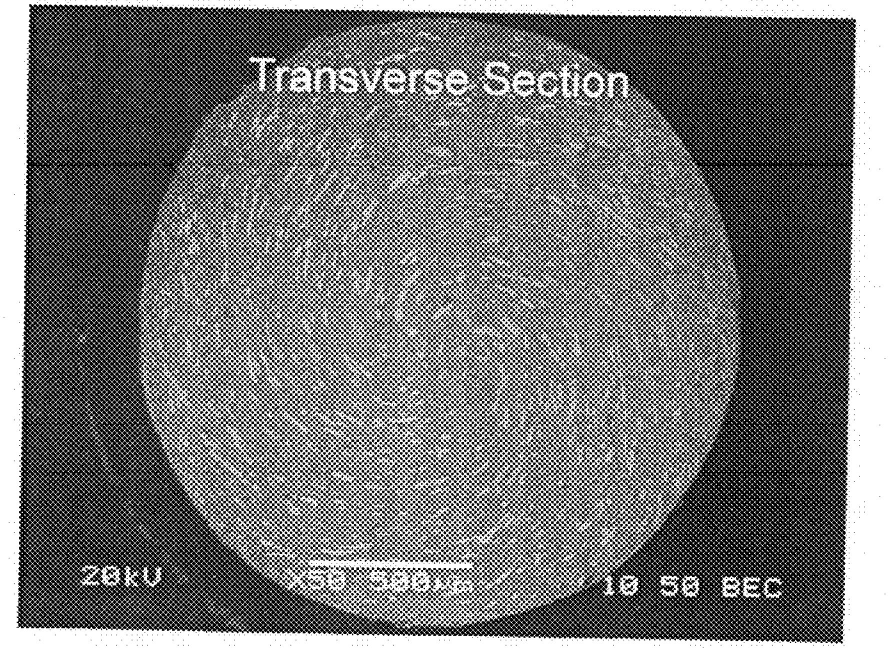
FIG. 2 is a transverse cross section of the Al-9 volume % Ca composite. In this back-scattered electron image, the light gray regions are Ca metal; the dark gray matrix is pure Al.
Figure 3:
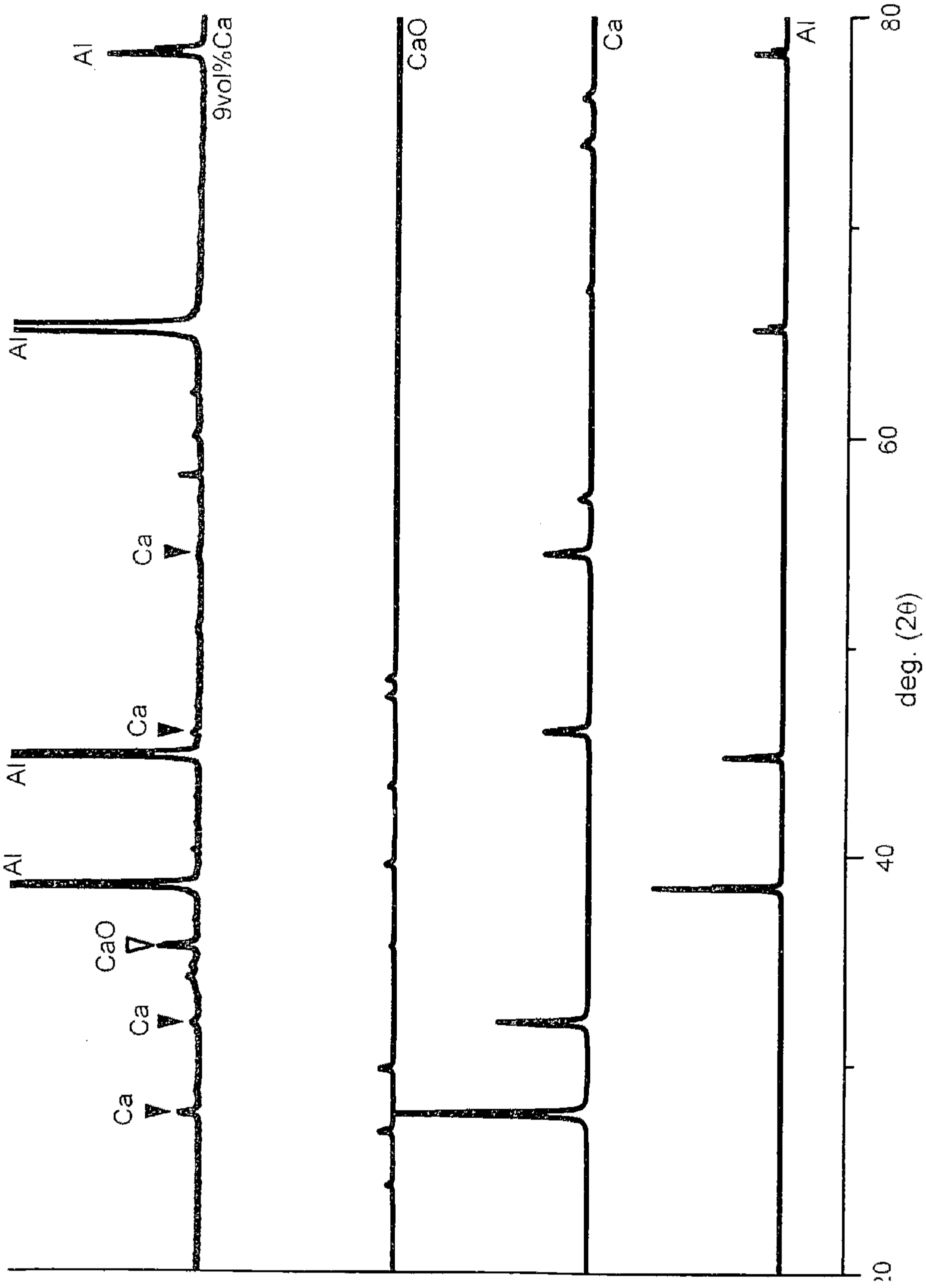
FIG. 3 is an X-ray diffraction pattern of as-extruded Al-9 volume % Ca composite (top) shown with reference patterns for CaO, Ca, and Al. Small peaks at 34° and 58° seem not to correspond to any of the peaks for the pure elements, $CaO_2$, $Al_2O_3$, hydroxides, or intermetallic compounds.
Figures 4A, 4B:
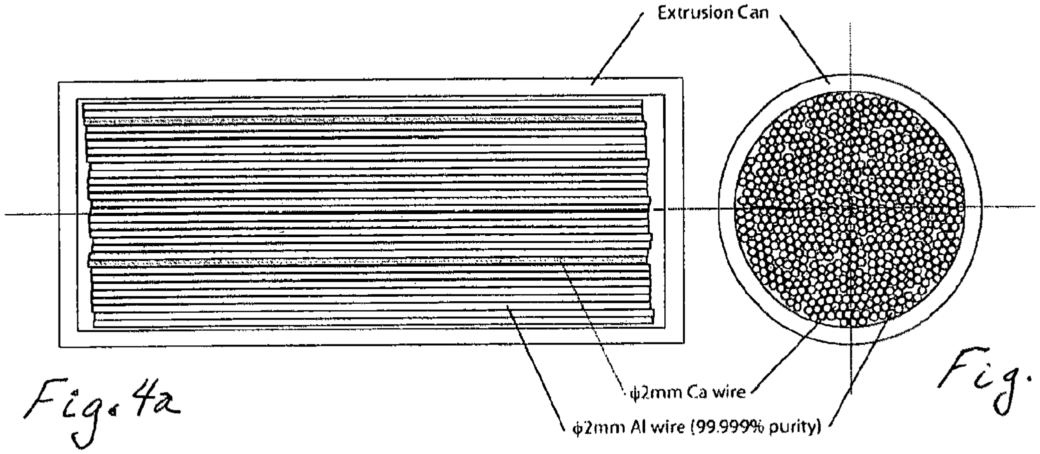
FIG. 4*a* is a longitudinal sectional view of bundled wire stack arrangement for an Al—Ca composite extrusion billet and FIG. 4*b* is a transverse sectional view thereof.

Microstructure—The microstructure of the wire had the long filaments of Ca metal distributed in an Al matrix (FIGS. 1-2). XRD analysis showed the expected FCC Al peaks and FCC Ca peaks (FIG. 3). There had been some concern that the heat of extrusion could cause an undesired reaction of Al and Ca to form one or more $Al_xCa_y$ intermetallic compounds, but no evidence of intermetallic compound formation during extrusion was observed. The appearance of the "swirl" pattern of the Ca filaments seen in FIG. 2 may prove to be advantageous in pinning dislocation motion and may result in higher strengths, similar to the effect produced by the convoluted-ribbon filament structure in Cu—Nb composites.

Conductivity—Room temperature electrical conductivity testing was performed on the Al-3% Ca, Al-6% Ca, and Al-9% Ca 1 mm diameter drawn but not heat-treated wires. This test indicated conductivities ranging between $(0.368)10^6$ and $(0.346)10^6$ $cm^{-1}\Omega^{-1}$ which is reasonably close to high-purity Al's room temperature conductivity of $(0.380)10^6$ $cm^{-1}\Omega^{-1}$. The rule-of-mixtures (ROM) conductivity prediction for an Al-9% Ca composite is $(0.373)10^6$ and ROM values for lower Ca content are still closer to $(0.380)10^6$ $cm^{-1}\Omega^{-1}$ but it is thought that dislocations from the cold swaging/drawing plus $Al_2O_3$ and CaO fragments present in the metal from the starting powders prevent the composite from attaining its full ROM conductivity value. For comparison, the conductivity values for the major competing commercial Al conductor materials are generally lower than the Al—Ca composite values:

Al-0.3% Zr $(0.35)10^6$ $cm^{-1}\Omega^{-1}$
5005-H19 aluminum alloy $(0.32)$ $10^6$ $cm^{-1}\Omega^{-1}$
6201-T81 aluminnum alloy $(0.31)$ $10^6$ $cm^{-1}\Omega^{-1}$
3M's Al—$Al_2O_3$ composite, "ACCR" $(0.19)10^6$ $cm^{-1}\Omega^{-1}$ Strength—Tensile tests were performed on the 3 mm diameter drawn but not annealed wire. These tests showed good ductility but, as expected, strengths were low ($\sigma_{UTS}$=80 to 100

MPa). Deformation processed metal-metal composites do not achieve high strength until the thickness of the reinforcing filaments drops below about 1 μm. Because fine Ca powders are not commercially available, coarse granules (−16 mesh, approximately 1.2 mm dia.) of Ca were used for the starting material in the extrusion; thus, the filaments in these tensile test specimens had been reduced to only about 5 to 20 μm thick after reduction to 3 mm diameter. This is too large to achieve a good strengthening effect. Further deformation will eventually reduce filament sizes to the range necessary for good strength. By comparison to tensile strength data available on the similar Al—Mg composite system (Xu K., Russell A. M., Chumbley L. S., Laabs Gantovnik V., and Tian Y., "Characterization of strength and microstructure in deformation processed Al—Mg composites", *Journal of Materials Science*, Vol. 34 (24) pp. 5955-5959, 1999), the Al-9% Ca composite is estimated to attain a strength of about 300 MPa when the Ca filament size (thickness) reaches 1 μm. The strongest commercially available Al conductors (6201 and 3M's Al—Al203 composite) have tensile strengths ranging from 310 to 330 MPa. Al—Ca composite strengths greater than 400 MPa should be achievable with Ca contents of 20 vol. %.

Corrosion—Wire specimens 1 mm in diameter have been weighed, photographed, and immersed in pure water and salt water for several weeks and weighed and photographed again. The specimens appear to show a small amount of early reaction, followed by stasis. This behavior presumably results from reaction of Ca filaments lying at the surface, followed by no additional reaction once an all-Al surface is established. Since the Ca filaments are not interconnected, corrosion of Ca filaments lying at the surface does not lead to corrosion of any internal Ca filaments because the Al matrix arrests corrosion once the Ca filaments at the free surface have fully reacted.

Density—The densities of Al—Ca composites are expected to follow a simple rule of mixtures trend. The Al-9% Ca composite has a density of 2.60 g/cm$^3$, which is about 4% lighter than the density of pure Al (2.70 g/cm$^3$). Density decreases further as Ca content increases; an Al-20 volume percent composite would have a density of 2.47 g/cm$^3$. For comparison, current commercially available Al conductor densities range from 2.69 g/cm$^3$ for 6201 alloy to 3.34 g/cm$^3$ for 3M's Al—Al203 composite.

$Al_2Ca$ formation—Heat treatment experiments were conducted to heat treat the Al—Ca composites to deliberately form the $Al_2Ca$ intermetallic compound. This compound is brittle (Laves phase, C15, cF24), so its presence would be undesirable while the wire is being extruded, swaged, and drawn. However, its melting temperature (1087° C.) is substantially higher than those of Al (660° C.) and Ca (842° C.), so once wire drawing is completed, it may provide better elevated temperature microstructure stability than pure Ca filaments. Conversion of Ca to $Al_2Ca$ was nearly complete after annealing for four hours at 350° C.

Cost—Cost factors are believed to be favorable for the composite of the invention since Ca is the 5th most abundant element in Earth's crust, and a well-established reduction process exists for Ca metal production. Ba and Sr are the 14$^{th}$ and 15$^{th}$ most abundant elements in Earth's crust, and they, too, have well-established methods for reduction to metallic form. The extrusion/drawing processing method used to produce the Al—Ca composites is the same process used today for most Al conductor production.

Example 2

In this example, wires of high-purity Al (e.g., 99.9% to 99.999% purity) and high-purity Ca or Sr are stacked inside an Al extrusion can with the centerlines of the wires lying parallel to the extrusion can's centerline (see FIGS. **4*a*, 4*b***). Both the percentage of alkaline metal wires and the diameter of the wires may be varied to achieve different combinations of strength and conductivity. Two examples of such an extrusion billet comprise (1)2-mm diameter Al wire of 99.99% purity comprising 91 vol. % of the can's contents mixed with 2-mm-diameter Ca wire of 99.9% purity comprising 9 vol. % of the can's contents, and (2)2-mm diameter Al wire of 99.99% purity comprising 91 vol. % of the can's contents mixed with 2-mm-diameter Sr wire of 99.9% purity comprising 9 vol. % of the can's contents. In both cases the can is evacuated to remove air, welded shut, and extruded at 285° C. to reduce the billet's diameter from 3.2" to 0.875", achieving a composite microstructure similar to that of the mixed powder method that was described in Example 1.

Al—Ca Composites—Tensile Tests:

Tensile tests were performed with Al-9 vol % Ca wires axisymmetrically drawn to true strains (η) of 6.27, 8.55, 12.45 and 13.76. Al-9 vol % Ca wires at η=6.27 and 8.55 were made by extrusion, swaging and wire drawing. The wires at true strains of η=12.45 and 13.76 were processed by bundling 1 mm outer dia. wires, then swaging and wire drawing the bundled assembly to achieve a fine wire.

Figure 5:
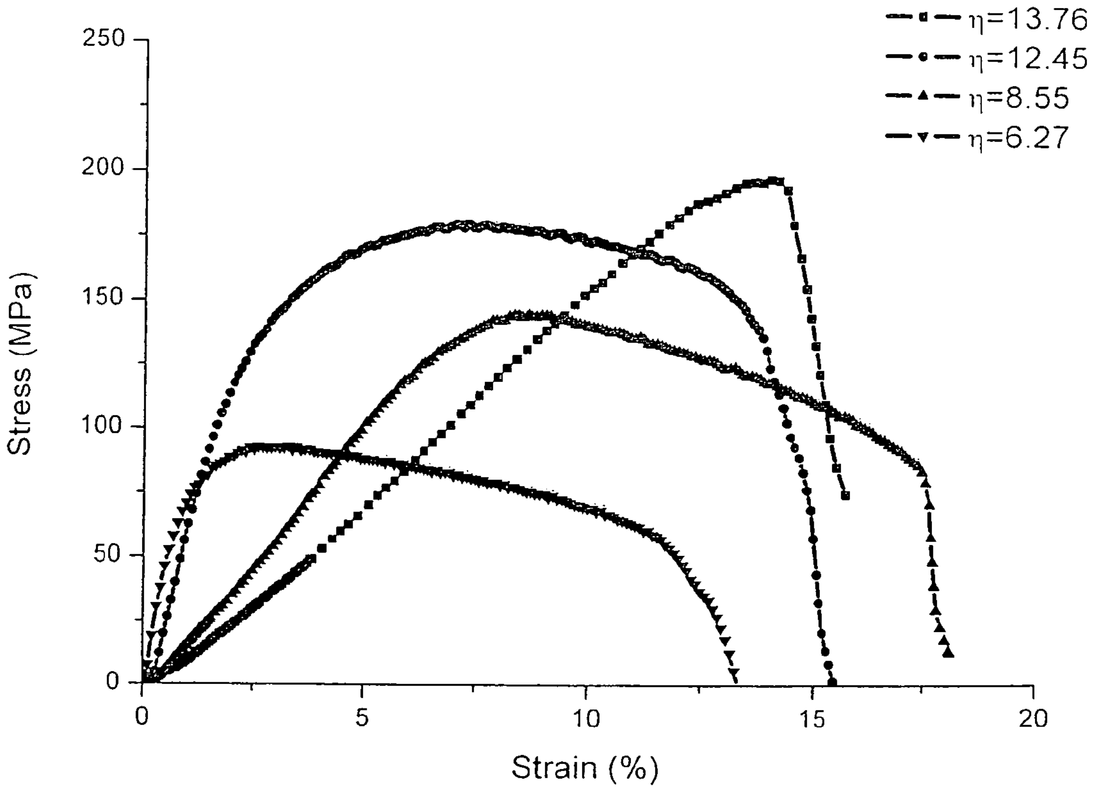
FIG. 5 are stress-strain plots of Al-9 vol % Ca specimens with $\eta$=6.27, 8.55, 12.45 and 13.76, where $\eta$ is the total true strain of deformation processing given to the specimen. The samples were too small to allow use of an extensometer, so the slopes of the elastic portions of the plots do not accurately represent elastic modulus.

FIG. 5 and Table 1 show tensile test results for specimens with η=6.27, 8.55, 12.45 and 13.76. Tensile tests were performed at room temperature. Values shown in Table 1 are the average values from two to four tensile tests at each level of deformation true strain. Plots shown in FIG. 5 are the plots for the tests that had the maximum ultimate tensile strength value at each deformation true strain.

TABLE 1

Average values of ultimate tensile strength and maximum strain for Al—9 vol % Ca specimens without heat treatment at η = 6.27, 8.55, 12.45 and 13.76.

| Specimen (True Strain, η) | Ultimate Tensile Strength (MPa) | Max. Tensile Elongation (%) |
|---|---|---|
| 6.27 | 93 | 13.3 |
| 8.55 | 145 | 18.1 |
| 12.45 | 180 | 15.5 |
| 13.76 | 197 | 15.7 |

Figure 6:
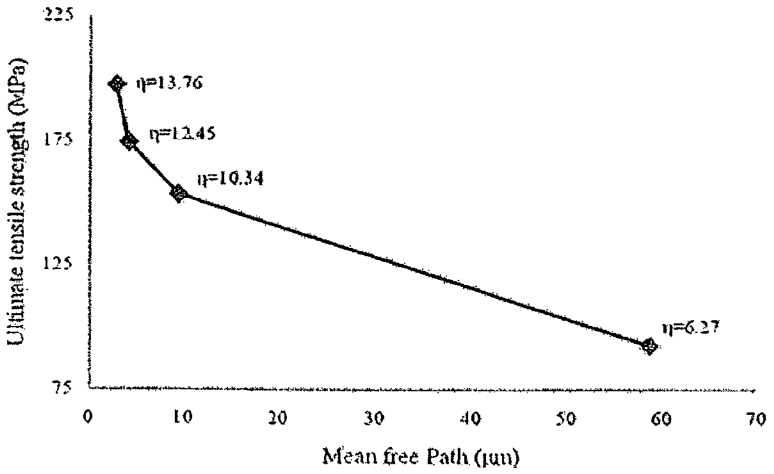
FIG. 6 shows the relationship between ultimate tensile strength and mean free path between Ca filaments.

The mean free path between Ca filaments was calculated with a 50 mm-long unit line on SEM micrographs of specimens with deformation true strains of η=6.27, 8.55, 10.34, 12.45, and 13.76. The relationship between mean free path and ultimate tensile strength is shown in FIG. 6.

In other metal-metal composites (e.g. Al—Ti) studied by the applicants, smaller mean free paths between filaments resulted in greater tensile strength. That trend is evident in FIG. 6 for Al—Ca. Presumably still smaller mean free path length would raise tensile strength in Al—Ca. Experiments to verify this speculation are currently in progress, but results are not yet available.

Al—Ca Composites—Microstructure:

For accurate analysis of the specimen's phases, XRD was used for heat-treated specimens. The 1-BM beamline with $LaB_6$ (wavelength=0.6066 Å) at the Advanced Photon Source (APS) at Argonne National Laboratory was used to acquire these diffraction patterns.

Figure 7:
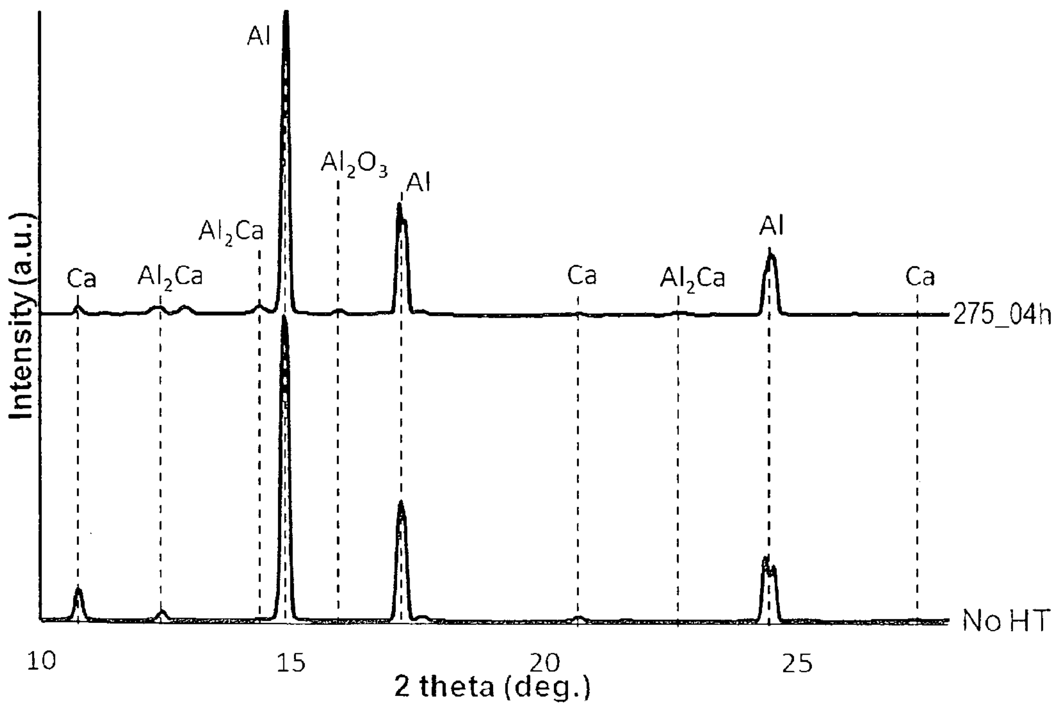
FIG. 7 are XRD patterns of two specimens ($\eta$=6.27), of non-heat treated (noHT), and heat treated at 275° C. for 4 hours (275_04 h).

The diffraction pattern shown in FIG. 7 was obtained from non-heat-treated (noHT) and heat treated at 275° C. for 4 hours (275_04 h) wires (η=6.27). This pattern indexed with Al, Ca, $Al_2Ca$, and $Al_2O_3$. The intensities of Ca peaks from specimen noHT were higher than in specimen 275_04 h; presumably Ca peaks weaken as Ca is consumed by the reaction to form $Al_2Ca$.

Figure 8:
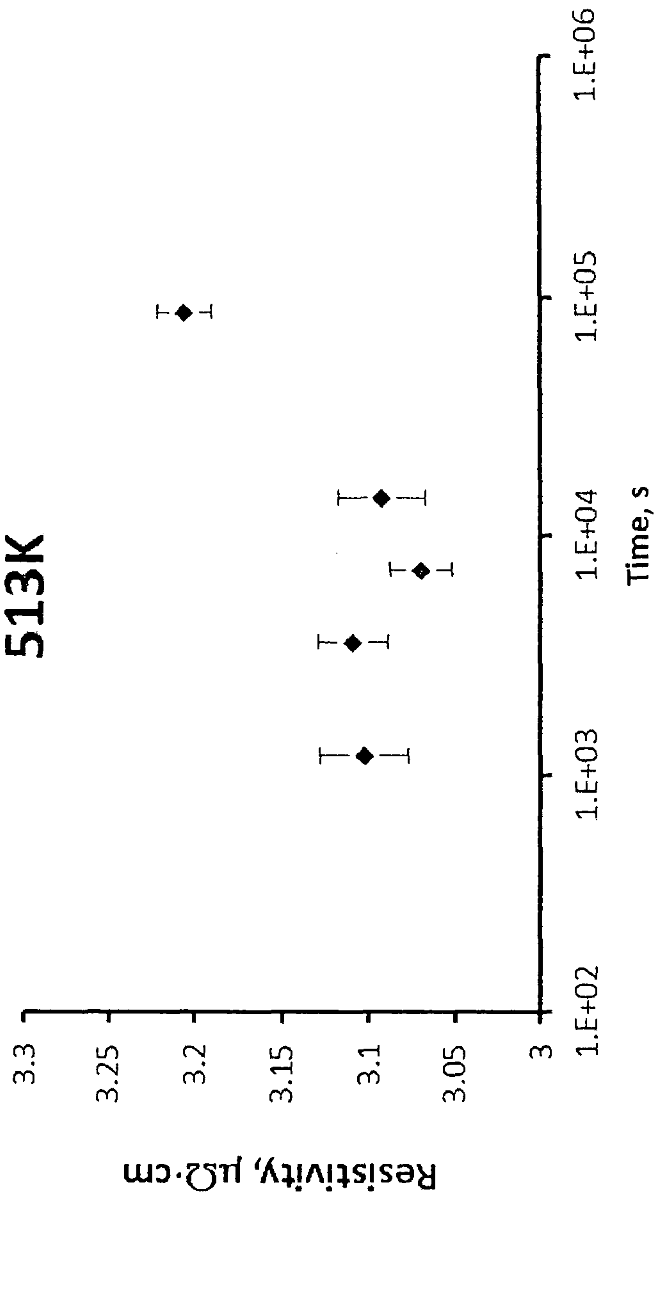
FIGS. 8, 9, 10, show resistivity measurements as a function of heat treatment time for initial heat treatment
Figure 9:
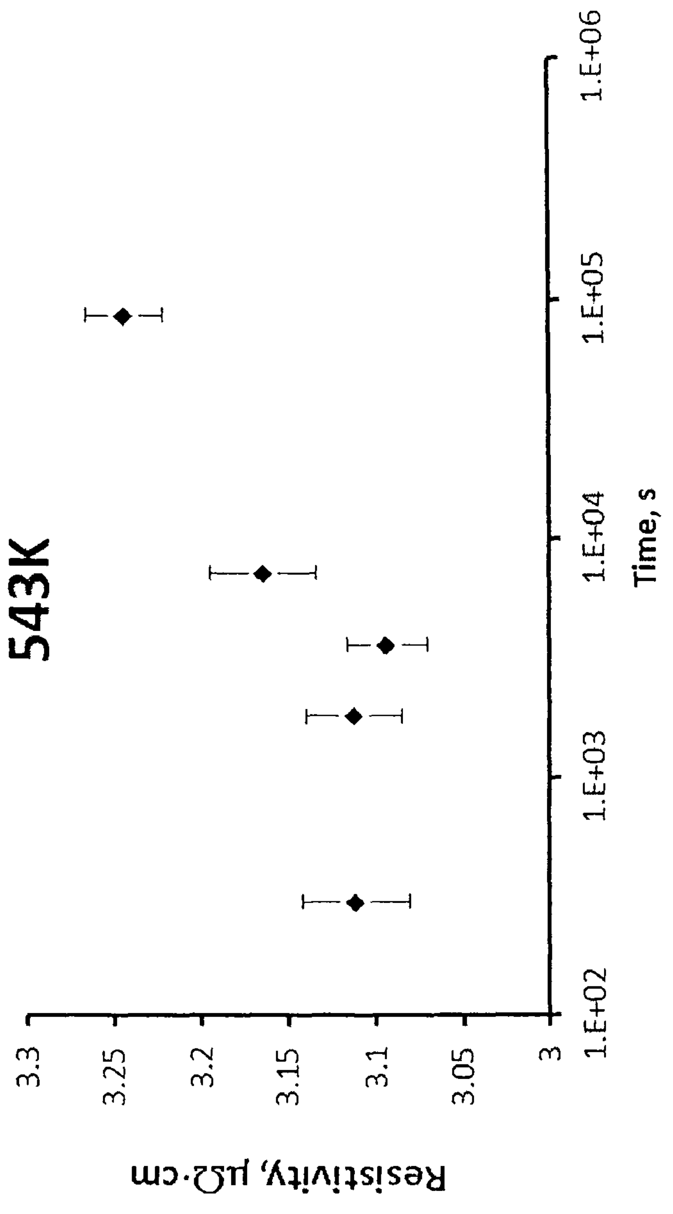
Figure 10:
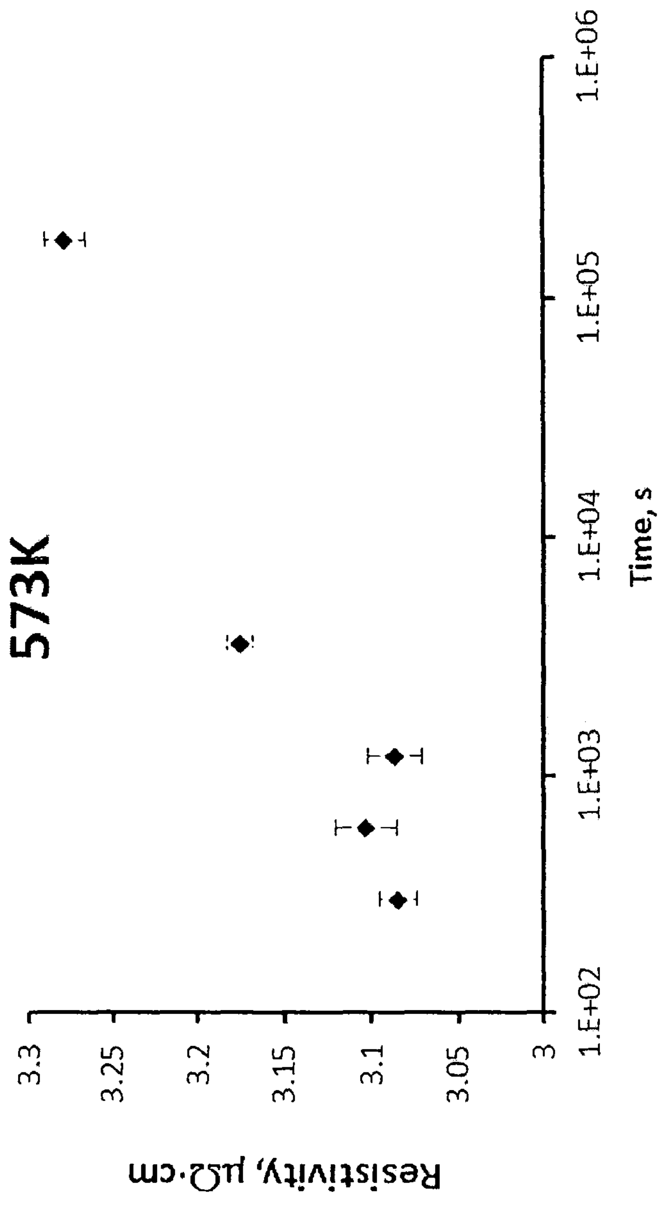
Figure 11:
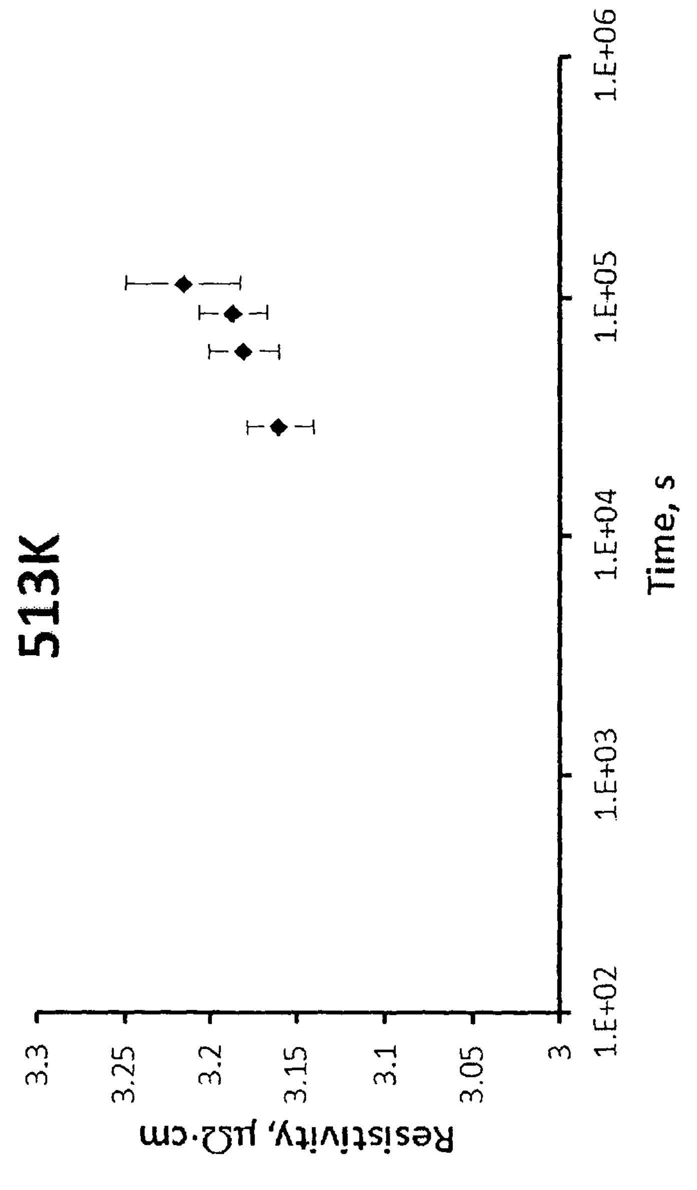
FIGS. 11, 12, 13 show resistivity measurements as a function of heat treatment time for additional heat treatments.
Figure 12:
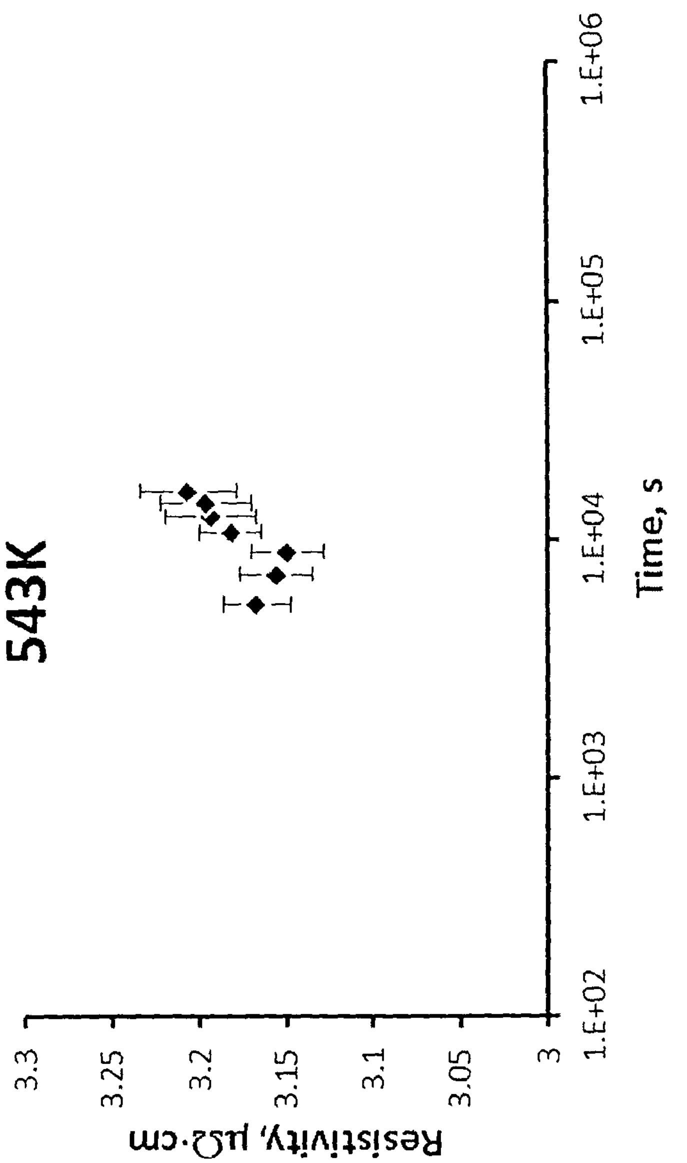
Figure 13:
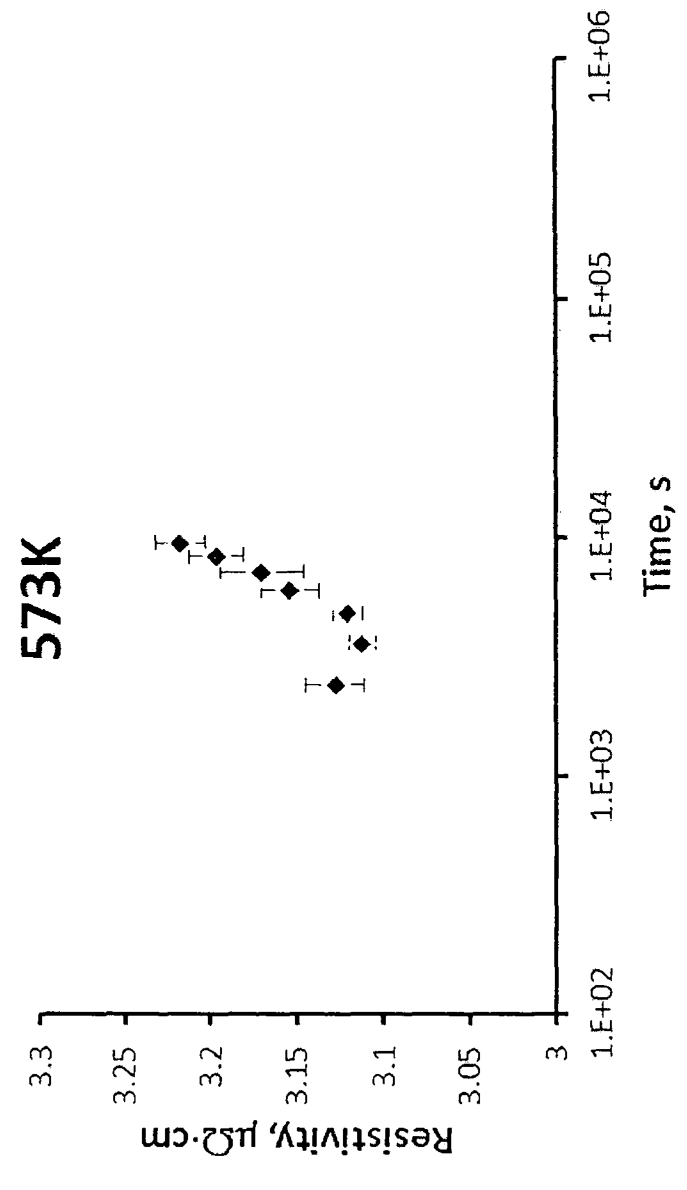

Al—Sr Composites-Resistivity Measurements:

Resistivity measurements were completed on the Al—Sr composite after heat treating the specimens at various times and temperatures. The response of the material to elevated temperature exposure is useful in understanding the reactions that occur in the metal during prolonged high-temperature service as a high-voltage power transmission line. Power transmission lines often operate at 100° C. for many thousands of hours, and they may sometimes operate as hot as 200° C. or even slightly hotter for short time periods (~a few hours) when demand for electric power is unusually high. Following each heat treatment, the wires were gently straightened, then resistance and diameter measurements were taken at three points down the length of the wire. Seven wires were tested at each time and temperature combination. The resistivity measurements are shown plotted versus time (logarithmically) for the initial heat treatments in FIGS. 8, 9, and 10 and additional heat treatments in FIGS. 11, 12, and 13. Error bars shown in each figure are plus and minus one standard deviation for each data point.

Two phenomena are occurring concurrently during these heat treatments. Residual work hardening from the wire drawing used to make the specimens is removed by recovery and recrystallization in both the Al and Sr phases. In addition, various Al—Sr intermetallic compounds begin to form by a chemical reaction between the two metals. The resistivity would be expected to decrease as work hardening is removed during the annealing, but resistivity would be expected to increase as intermetallic compounds form because those compounds are probably poorer conductors of electricity than are pure Al and pure Sr.

Resistivity values for all samples approached the value of 3.095 μΩ·cm prior to beginning any significant increases in resistivity, which allowed this value to be used as $\rho_0$. This behavior can be seen in FIGS. 8, 9, 10 and 12, 13. Interestingly, when the samples are heat treated to a time that was expected to be within the inflection point of the reaction, the resistivity value is higher than $\rho_0$; yet upon subsequent heat treatments, the resistivity drops again prior to increasing at a rapid rate. This can be observed clearly in FIGS. 12 and 13. This behavior is expected to have occurred in the 513K samples as well (FIG. 11), yet it is believed that the measurement steps were too large to observe it at this temperature, or it may have occurred prior to the first measurement.

The resistivity values increased rapidly following the plateau and were used to determine the reaction kinetics. Using Avrami-type equations, the activation energy was calculated. The $\rho_0$ value was determined to be 3.095 μΩ·cm, leaving only the $\rho_{max}$ value undetermined. The $\rho_{max}$ value was obtained from the 573K, 49-hour sample. The reaction at this temperature was observed to proceed rather quickly when observing resistivity values as a function of time, indicating that at this high temperature and long time interval, the rapid reaction will be essentially complete. The value for $\rho_{max}$ used for calculating the transformation fraction (x) was 3.28 μΩ·cm. The transformation fraction was plotted versus the time per the equation:

$$\ln\ln\left(\frac{1}{1-x}\right) = n \cdot \ln t + n \cdot \ln k$$

This allowed linear regression by least squares to be performed to determine the constants n and k. Using this method, the activation energy (Q) was calculated to be 108 kJ/mol. Comparing the calculated value of the activation energy to that of similar literature values and Wongpreedee's DMMC breakdown measurements provides some insight into this activation energy. No activation energy for Al—Sr intermetallic formation was found in the literature, so this determination is believed to be the first ever performed on the Al—Sr system.

Scanning Electron Microscopy:

Longitudinal and transverse images were taken of many of these resistivity samples. The specimens were produced by extruding a bundle of Al and Sr wires in an Al can, then swaging and wire drawing the extrudate. The sample was extruded from a starting diameter of 89 mm down to 26 mm (extrusion ratio of 11.77). The extrusion was performed at 561K. Following extrusion, Al can material was allowed to remain on the exterior of the Al—Sr composite, because this would protect any surface Sr from reaction with the atmosphere. The extruded Al—Sr composite was swaged from 26 mm diameter to 6.3 mm diameter, where drawing began. The sample was further reduced to a 1.10 mm diameter via hydraulically assisted wire drawing and hand drawing of the wire, producing a wire at true strain, η, of 8.79.

Figure 14:
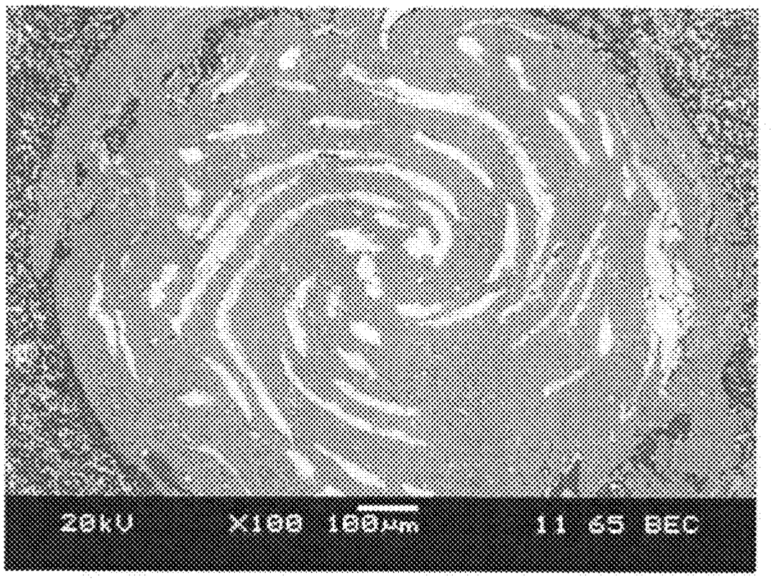
FIG. 14 shows a typical transverse cross section of Al—Sr DMMC (573K 49 hours).

This processing generates a composite with a pure Al matrix containing long, narrow filaments of Sr lying parallel to the wire's cylindrical axis. The transverse images of the Al—Sr composite display an unexpected whorl pattern, FIG. 14. Traditionally the microstructure in DMMC materials where both phases share the fcc crystal structure is one of cylindrical rods surrounded by the matrix phase. No micrographs were taken of the as-extruded Al—Sr composite, but since the processing method used to produce both the Al—Ca and Al—Sr composites was identical, and the elemental constituents are very similar, it is quite likely that the whorl pattern was present in the Al—Sr composite immediately following extrusion as well. There are multiple possible explanations for this deviation from expected behavior of the transverse microstructure, although applicants do not wish or intend to be bound by any explanation or theory below. The extrusion was done at an elevated temperature, and during the extrusion the sample may have been forced to twist in order to pass through the initial die. Additionally, both Sr and Ca have high-temperature bcc crystal structures. The combination of heat and stress may induce temporary formation of the high temperature bcc phase in Sr. Fcc phases typically deform into cylinders, but a bcc phase would be expected to deform in a plane strain mode, producing the ribbon-shaped Sr filaments observed in the microstructure. Supporting this hypothesis is the nature of deformation by swaging. Swaging is known to deform materials non-uniformally, with greater stress/deformation occurring near the surface of the rod than at the center of the rod. In the whorl pattern, the very outside edges of the piece often show the thinnest and longest ribbons, whereas near the center, nearly circular cross sections can be observed. If a stress-induced phase transformation were occurring, it would be expected to occur near the area of greatest stress, or near the outside edges of the sample in this case. The transition from fine ribbons at the outside edges of the sample to roughly cylindrical contours in the center would seem to support this hypothesis, although again applicants do not wish or intend to be bound by any theory or hypothesis.

In all SEM/BSE images, the darker phase is Al with the lighter phase being pure Sr or Sr-rich phases. Sr oxide is often present in many images, appearing white or light gray. Some images showed small ribbons of a third gray phase near the edge of the sample. This is known to be a thin layer of Ca that was a result of "zone overlap" in the initial extrusion. The volume percentage of Ca observed in these images is small enough to provide a negligible contribution to any reaction kinetics.

Figure 15:
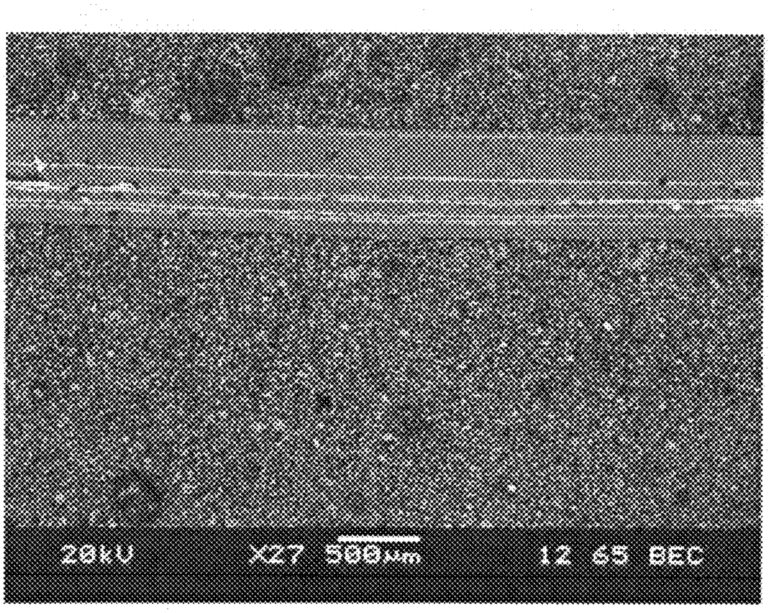
FIG. 15 shows a typical longitudinal cross section (No HT).

The appearance of longitudinal cross sections varied based upon the position of the section through the Al—Sr rod. Typical images were of an Al matrix with Sr filaments traversing the entire length of the sample (FIG. 15). In addition to appearing in small filaments, Sr also appeared as a large mass of varied shapes. This microstructure resulted from sectioning through the Al—Sr composite such that one of the flatter parts was in plane with the polished surface. Accordingly, longitudinal images proved less useful than transverse sections for comparisons between microstructures. The sectioning plane through the filaments was never consistent, resulting in widely varying measured thicknesses. Images were taken of all samples in longitudinal cross sections, yet transverse sections were used to illustrate any changes that may have occurred.

A comparison of microstructures across the range of heat treatments near the inflection point for the 573K sample allowed for an analysis of the reaction that is observed by electrical resistivity measurements. The whorl pattern that developed made comparison of filament thickness inaccurate and thus could not be used.

In transverse cross section, the No HT sample shown in FIG. 16 is observed to have the whorl-shape microstructure with fine filaments. The filaments appear deceptively thick in these images due to the rapid oxidation of Sr to form SrO. SrO oxide was observed to swell and crumble on any exposed regions of the sample, which broadens the apparent filament thicknesses.

Figure 18:
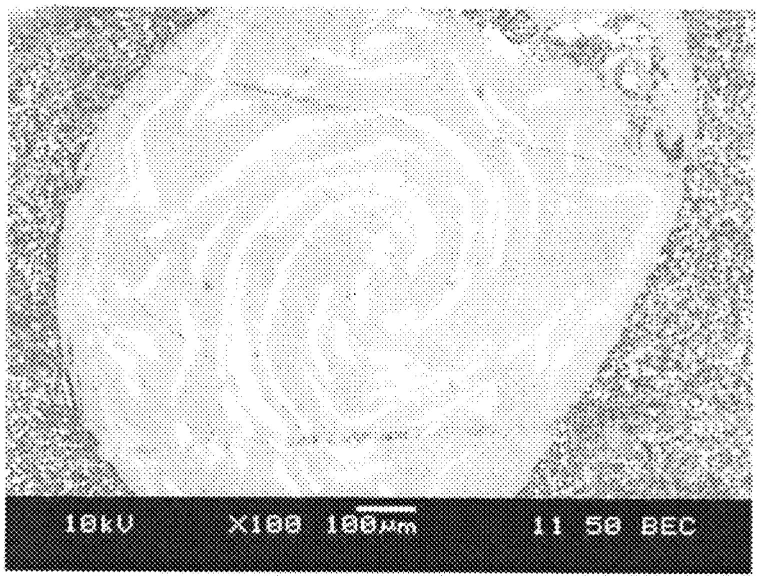
FIG. 18 shows a transverse cross section of Al—Sr heated at 573K for 1.33 hours.

SEM/BSE images of the microstructures of samples heat treated at 573K for 1.33 hours are shown in FIGS. 17 and 18. The morphology of the microstructure has changed little, yet at higher magnifications, a small amount of a third phase was observed around the edges of the filaments in a transverse cross section. Transverse cross sections were measured for average filament thickness and phase percentage. The filaments had grown slightly when compared to the 573K 1 hour sample. Transverse images at higher magnifications show a small amount of a third phase around the outside of some filaments that may have contributed to the increased thickness of the filaments. However, these third phase regions were too small to yield any accurate EDS spectra to determine elemental constituents.

Figure 19:
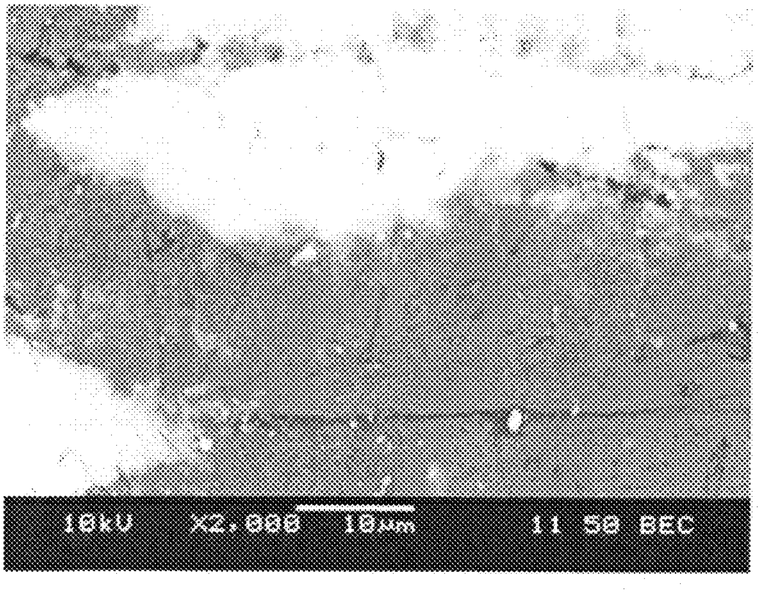
FIG. 19 shows an interface phase (thin medium gray band between the lighter gray Sr phase and the darker gray Al phase) in the 573K 1.67 hour sample.

Samples were also imaged after heat treatments at 573K for 1.67 and 2 hours. At a large scale, the microstructure remained similar to the No HT, 1 hour, and 1.33 hour samples. However, at higher magnifications the phase that was observed on the interface now appears to be thicker. FIG. 19 illustrates the increased thickness of the third phase at the Al—Sr interface. The additional phase was observed as nearly encompassing many Sr filaments in the transverse orientation in both samples. This supports the hypothesis that this is an additional phase (presumably an intermetallic compound) forming and growing during the heat treatments and not just residual Sr embedded in the surface layer due to polishing artifacts.

Figure 20:
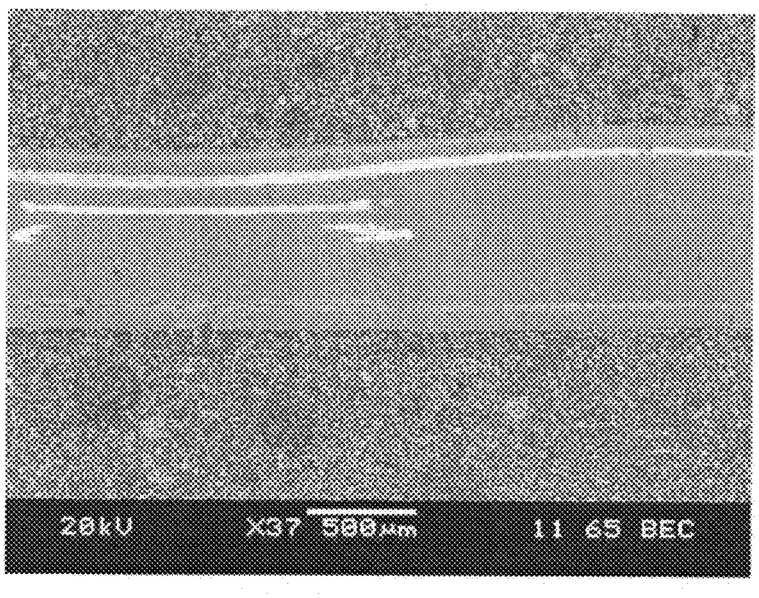
FIG. 20 shows the longitudinal cross section of the sample after 573K 49 hours.
Figure 21:
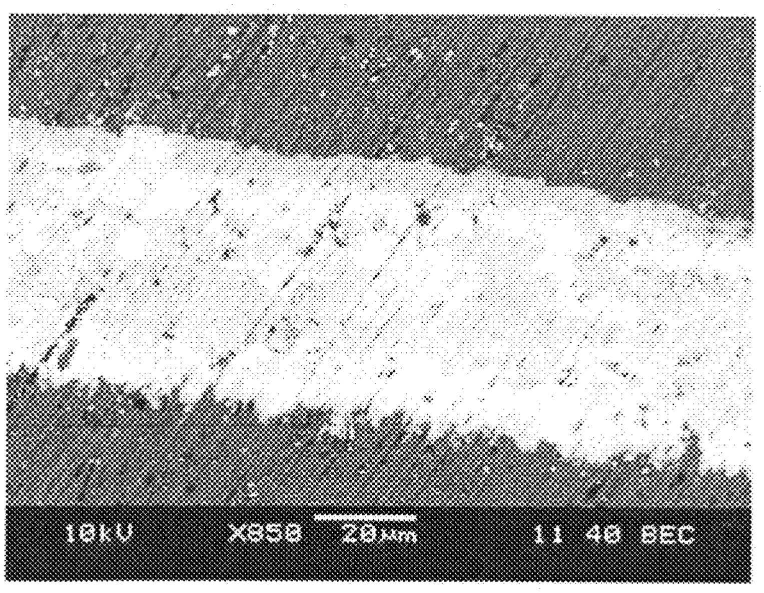
FIG. 21 shows the 573K 49 hours-treated filament in longitudinal cross section. Energy dispersive spectroscopy (EDS) suggests that the intermediate gray phase is Al—Sr intermetallic, the dark gray phase is Al, and the light gray phase is Sr (oxide).

The Al—Sr 573K 49-hour sample (FIGS. 20 and 21) displayed a microstructure in what is assumed to be the fully reacted state. The observed microstructure was strikingly similar to the as-swaged (No HT) sample, although oxidation was not as extensive. Longitudinal images of the composite showed an Al-matrix with fine second phase filaments running the entire length of the sample. There may be no pure Sr remaining in this specimen, since only limited oxidation occurred, and the intermetallic compounds presumably have lower oxidation rates than does pure Sr.

Figure 22:
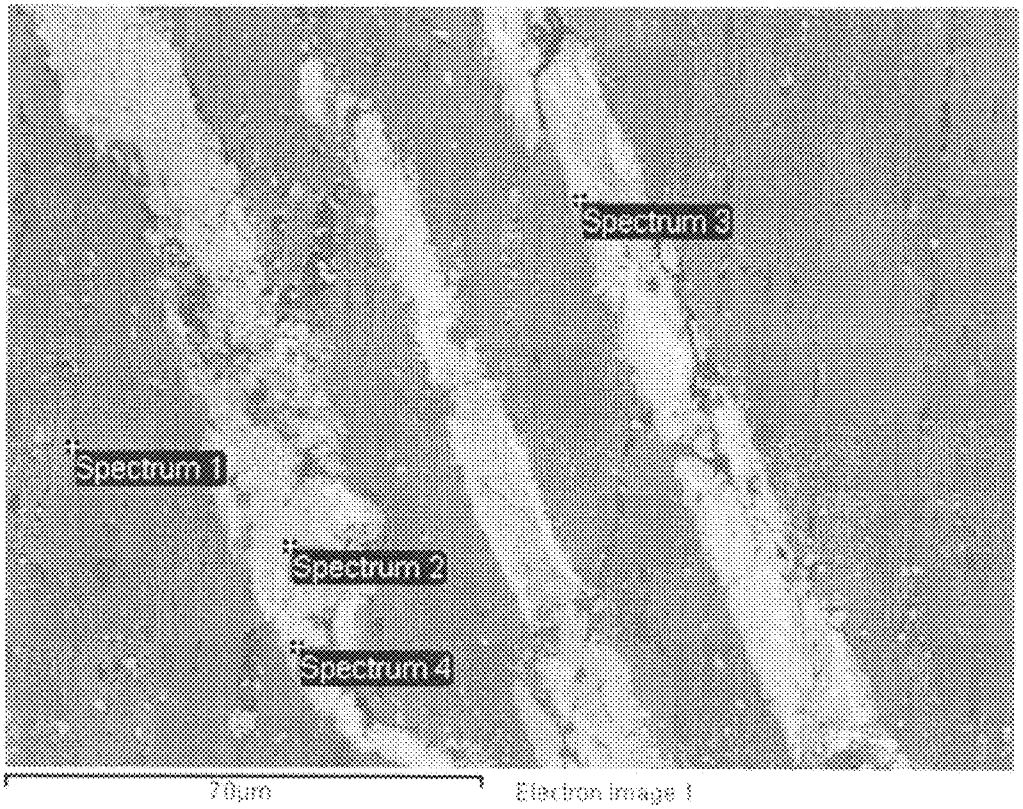
FIG. 22 shows the locations from which the EDS spectra of FIG. 23 were obtained for a 573K 49 hours-treated sample.
Figure 23:
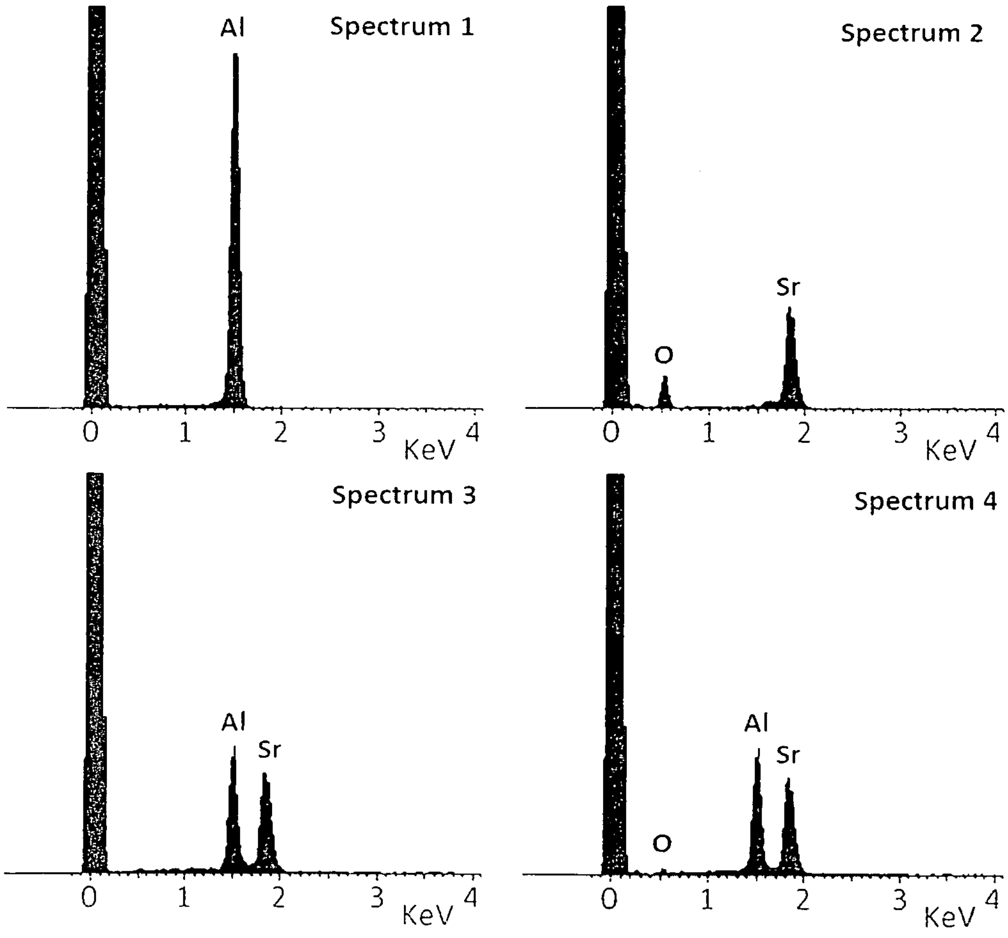
FIG. 23 shows EDS Spectra from selected points of a 573K 49 hours-treated sample.

It is interesting to note that the interface between the Al matrix and the second phase filaments remains sharp even with long times at 573K. In addition, the interface appears well bonded between the two phases. Images of the 573K 49-hours samples also show two phases within the filaments. There is a dark gray phase, (Al), a light gray phase (SrO), and a bright white phase (Al—Sr mixture) that was observed in the filaments in both transverse and longitudinal samples. EDS was used to confirm the atoms present in each phase. EDS spectra are shown for a transverse section of the Al—Sr composite that has been heat treated at 573K for 49 hours (FIGS. 22 and 23). Thus, the Al matrix, which will carry most of the electricity remains essentially free of dissolved Sr, even after this long, 300° C. annealing treatment. Such behavior is part of composite system pursuant to the invention where the preference for Sr (and Ca and Ba) is based on essentially zero solid solubility in the Al matrix phase. Thus, there is no chemical driving force for transport of the Sr atoms into the Al matrix phase that would decrease (probably drastically) the conductivity of the matrix Therefore, applicants can preserve the matrix phase and allow the intermetallic phase "skin" to form around the Sr filaments with additional protection against interdiffusion of the Sr into the Al matrix at elevated temperatures. This indicates that the composite should be able to withstand extended operation at temperatures as hot as 300° C. without suffering from the degradation in electrical conductivity that would result if Sr atoms were diffusing into the pure Al matrix phase.

The bright white phase occurred largely on the edges, yet was observed near the center in some places. Because the bright white phase is lighter than the other phases, it must have a higher average Z (Z=the number of protons in the atoms' nuclei; for Al, Z=13; for Sr, Z=38), presumably from a higher Sr content. EDS shows that the darkest phase (spectrum 1) is entirely Al, yet the intermediate gray phase (spectrum 2) has both Sr and O atoms. It can be inferred due to the oxidation of Sr that this section would be 100% Sr if oxidation had not happened. The third, lightest gray phase (spectra 3 and 4) was identified by EDS as containing Sr and Al. Small amounts of oxygen were detected in this phase, yet they are barely above the background. EDS data confirm that rather than the microstructure spheroidizing, intermetallic compound formation is occurring as heat treatments progress.

In the 573K 49-hour sample, the general morphology of the microstructure has not changed from the initial, unannealed state. It has been shown that electrical resistivity increases may result from the breakdown of the filament microstructure in the composite by solutionizing the filaments. In the Al—Sr DMMC, no solutionizing has occurred between the Al or Sr. Additionally, no microstructure change has occurred via the transformation of the filaments into spheres since at long times and high temperatures the shape of the second-phase filaments remained consistent. Thus, it appears that the possibility of the resistivity increasing due to spheroidization is not a factor in these specimens, and the only remaining possibility for a significant increase in resistivity during prolonged periods of high-temperature operation as a power transmission line is the formation of one or more intermetallic compounds.

To compare the morphology of the microstructure (Table 2), transverse SEM/BSE images were measured for filament thickness and phase fraction. Measurement bias was reduced in the thickness measurements by placing four lines intersecting at the center of the wire and measuring the thickness where the filament intersected the lines. The phase fraction was measured by printing the SEM images such that each was 9 in by 6.75 in, overlaying a grid made up of 0.25 in by 0.25 in squares and counting the number of total intersections compared to intersections that land on the second phase. The filament thickness for the No HT sample was likely skewed larger than actually present due to the swelling effect of the rapid oxidation that took place prior to insertion into the SEM. The oxide spalled and crumbled out onto the surface following polishing, making the filaments appear larger than in later samples that had been head treated.

TABLE 2

Microstructure changes with heat treatments in Al—Sr composites

| | Sample | | | | | |
|---|---|---|---|---|---|---|
| | No HT | 573 K 1 hr | 573 K 1.33 hr | 573 K 1.67 hr | 573 K 2 hr | 573 49 hr |
| Filament Thickness (μm) | 10.6 | 8.57 | 10.5 | 14.0 | 13.9 | 16.7 |
| % Second Phase | 11.4 | 9.1 | 12.3 | 15.6 | 14.5 | 17.8 |

The samples with no heat treatment and heat treated at 573K for one hour show very few changes in microstructure. The 573K 1-hour heat treatment lies within the initial plateau of the resistivity measurements, indicating that the resistivity increase is not by nature a morphology or phase formation increase. Possible explanations for the resistivity plateau that remain possible include a loss of texture through recrystallization and the relaxation of residual stress in the Al matrix, although applicants do not wish or intend to be bound by theory in this regard. However, a clear trend is observed in the samples as the phase fraction and filament thickness increase almost universally as the time at temperature increases. The exception to this increase lies between the 1.67 hours and 2 hours samples, and in that case the change is probably attributable to small variations between samples. Longitudinal cross sections of the samples show that the filaments are not growing in the transverse direction at the expense of the longitudinal direction:

Longitudinal filaments remain visible in roughly equal proportions as heat treatments progressed.

The increase in second phase percentage from 9% to nearly 18% as the Al—Sr composites were heat treated for 49 hours at 573K constitutes a moderate amount of Al/Sr transforming into a third phase. This is to be expected, as the intermetallic phase would require significant amounts of Al to form. Al would be diffusing into Sr at a much quicker rate than Sr would diffuse into Al due to the large difference in the sizes of Al and Sr atoms (Al is a much smaller atom than is Sr), resulting in a shell forming on the outside of the Sr filaments that appears to grow into the Al matrix.

Figure 24:
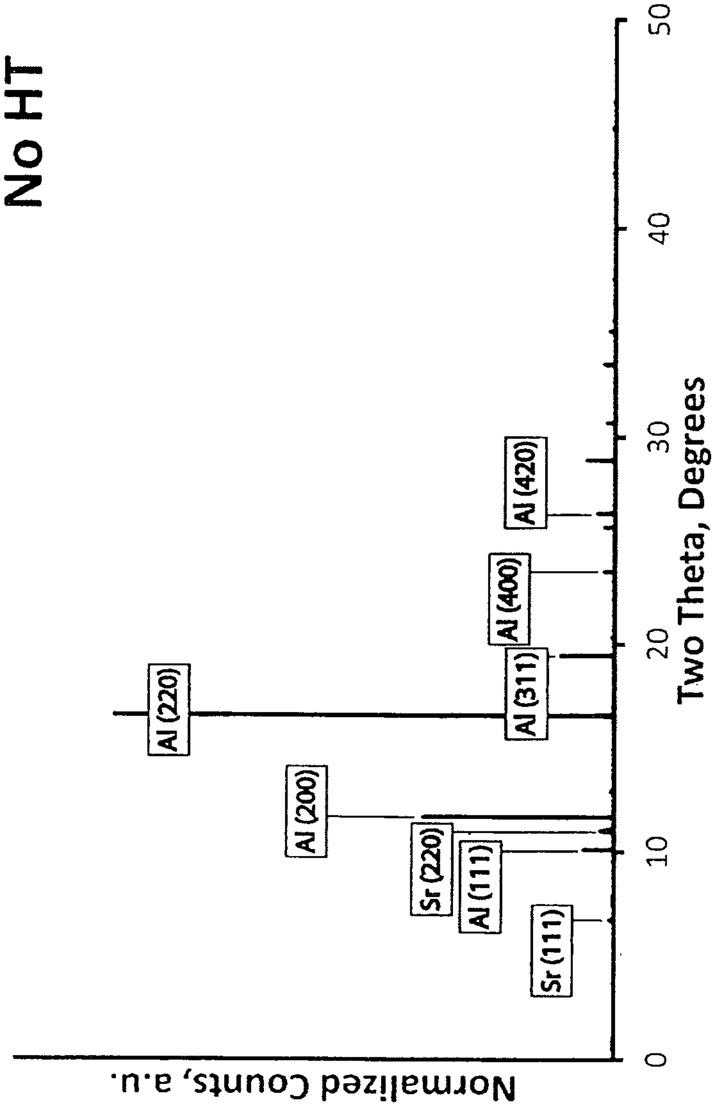
FIG. 24 shows XRD (full scale) for Al-9Sr sample no heat treatment.
Figure 25:
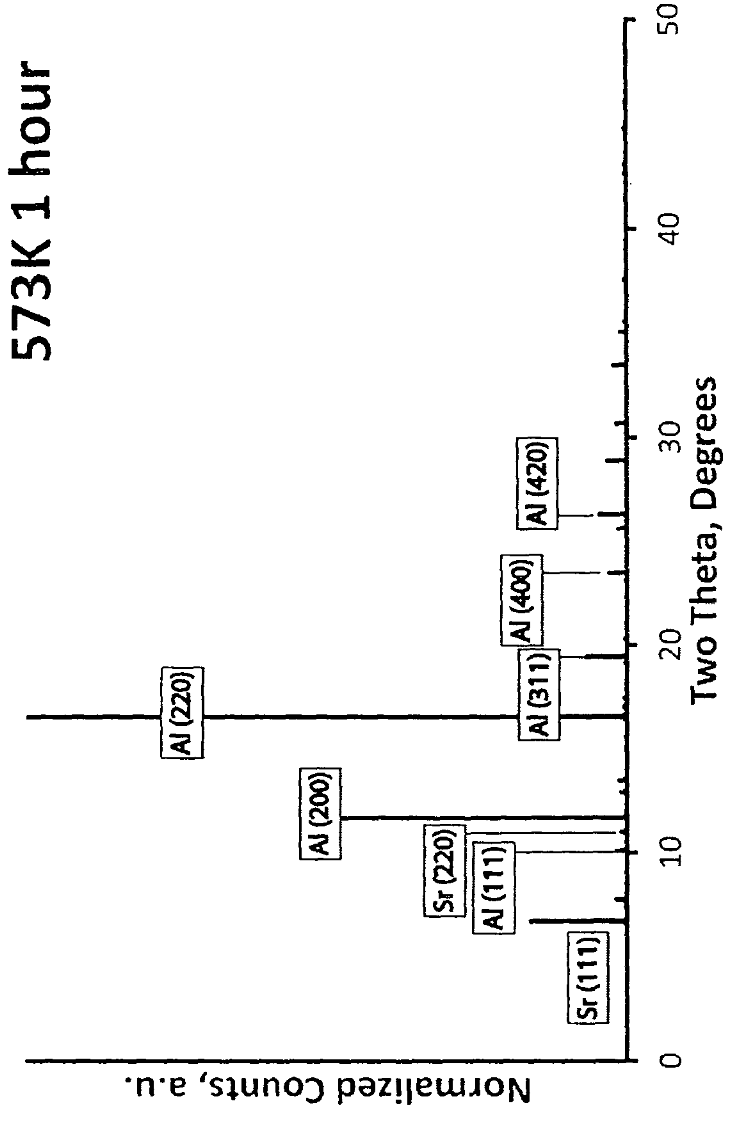
FIG. 25 shows XRD (full scale) for 573K, 1 hour-treated sample.
Figure 26:
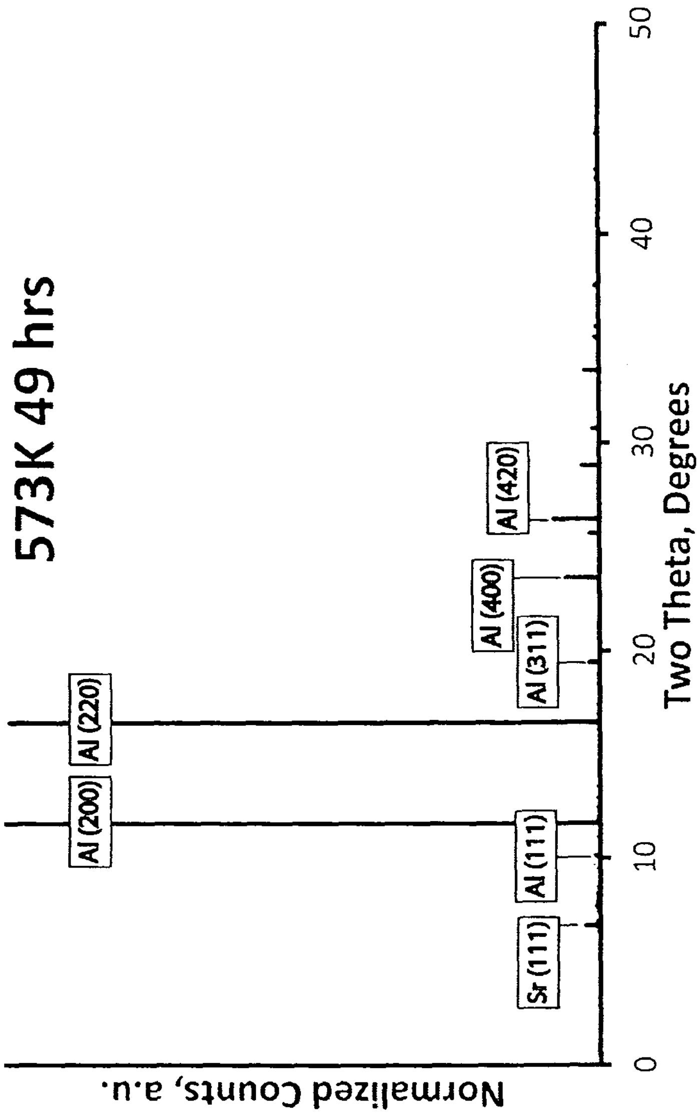
FIG. 26 shows XRD (full scale) for 573K, 49 hours-treated sample.
Figure 27:
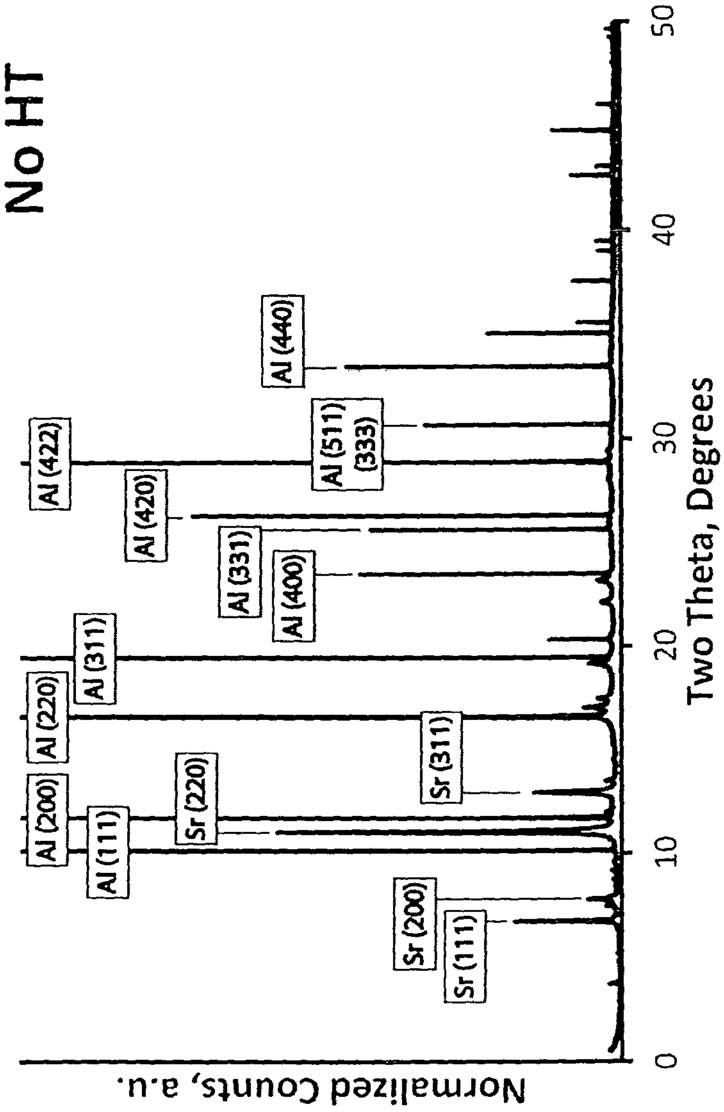
FIG. 27: shows zoomed XRD for No heat treatment sample.
Figure 28:
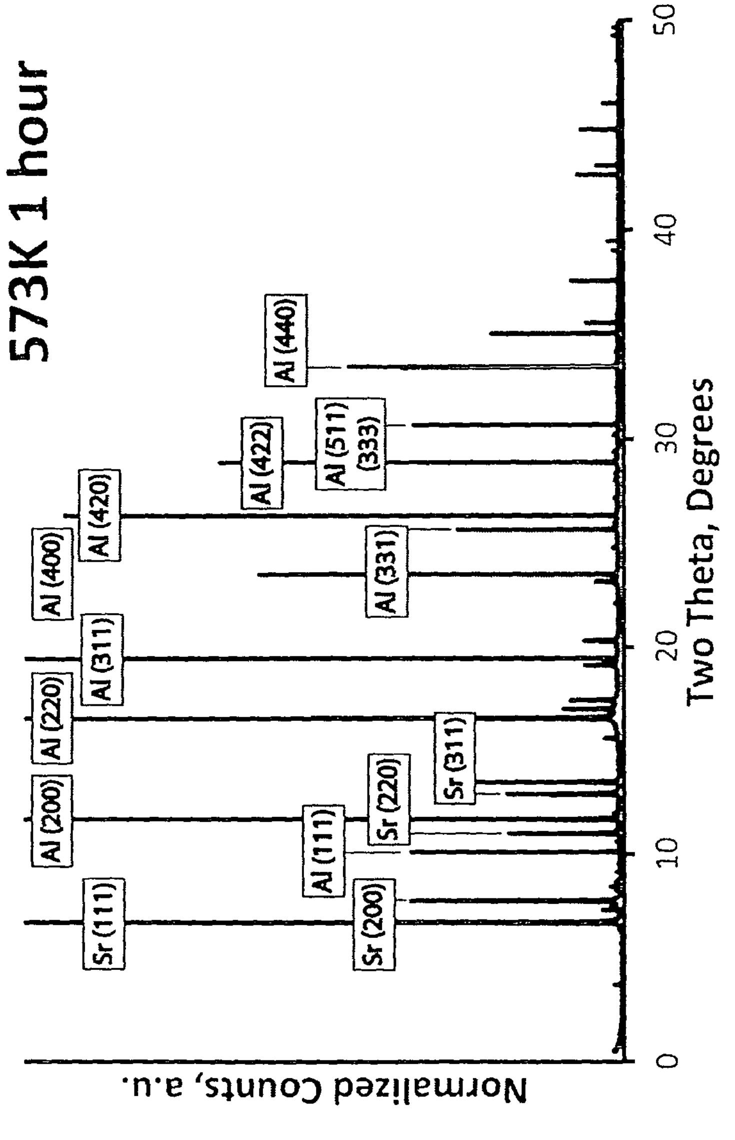
FIG. 28 shows zoomed XRD for 573K, 1 hour-treated sample
Figure 29:
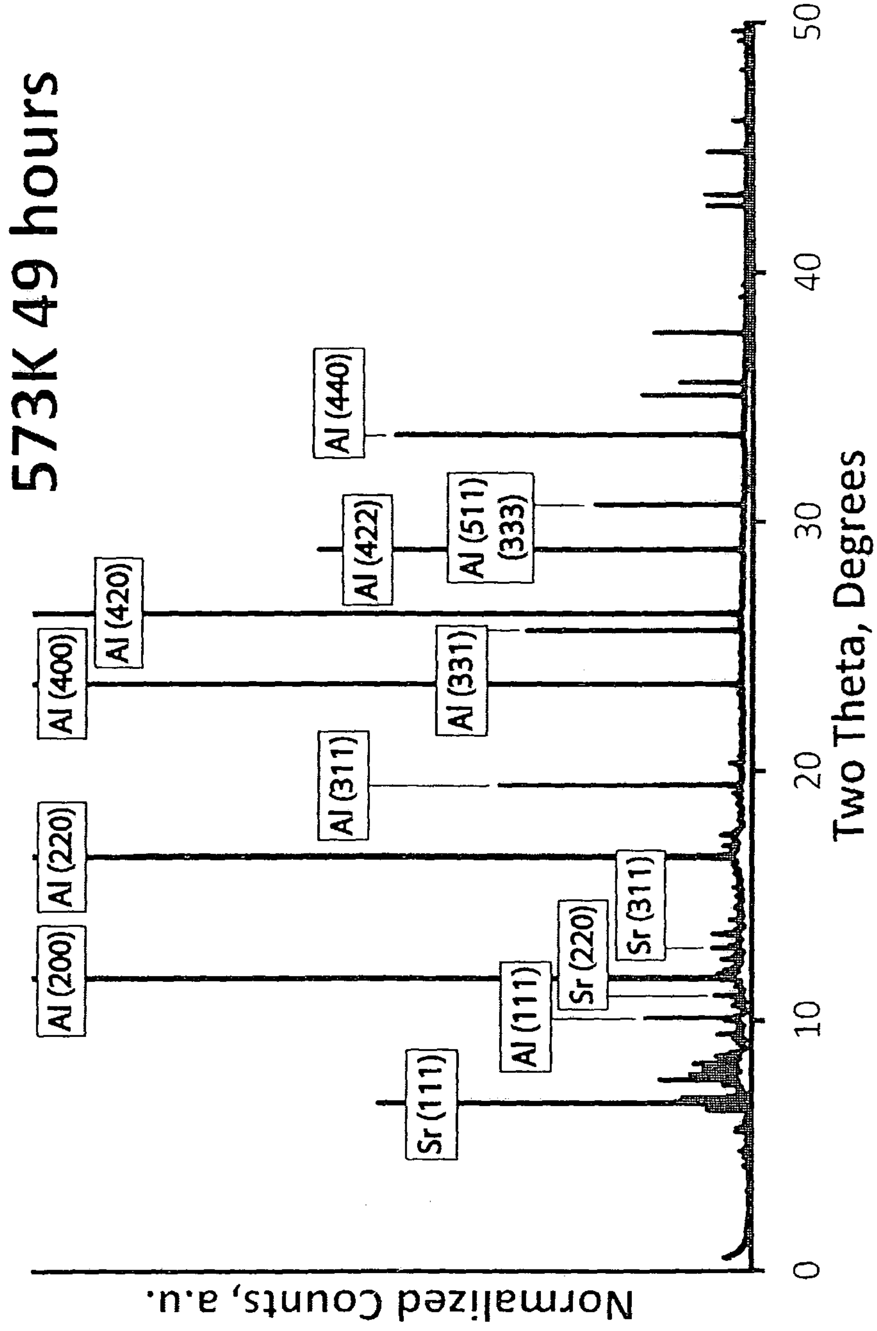
FIG. 29: shows zoomed XRD for 573K, 49 hours-treated sample.
Figure 30:
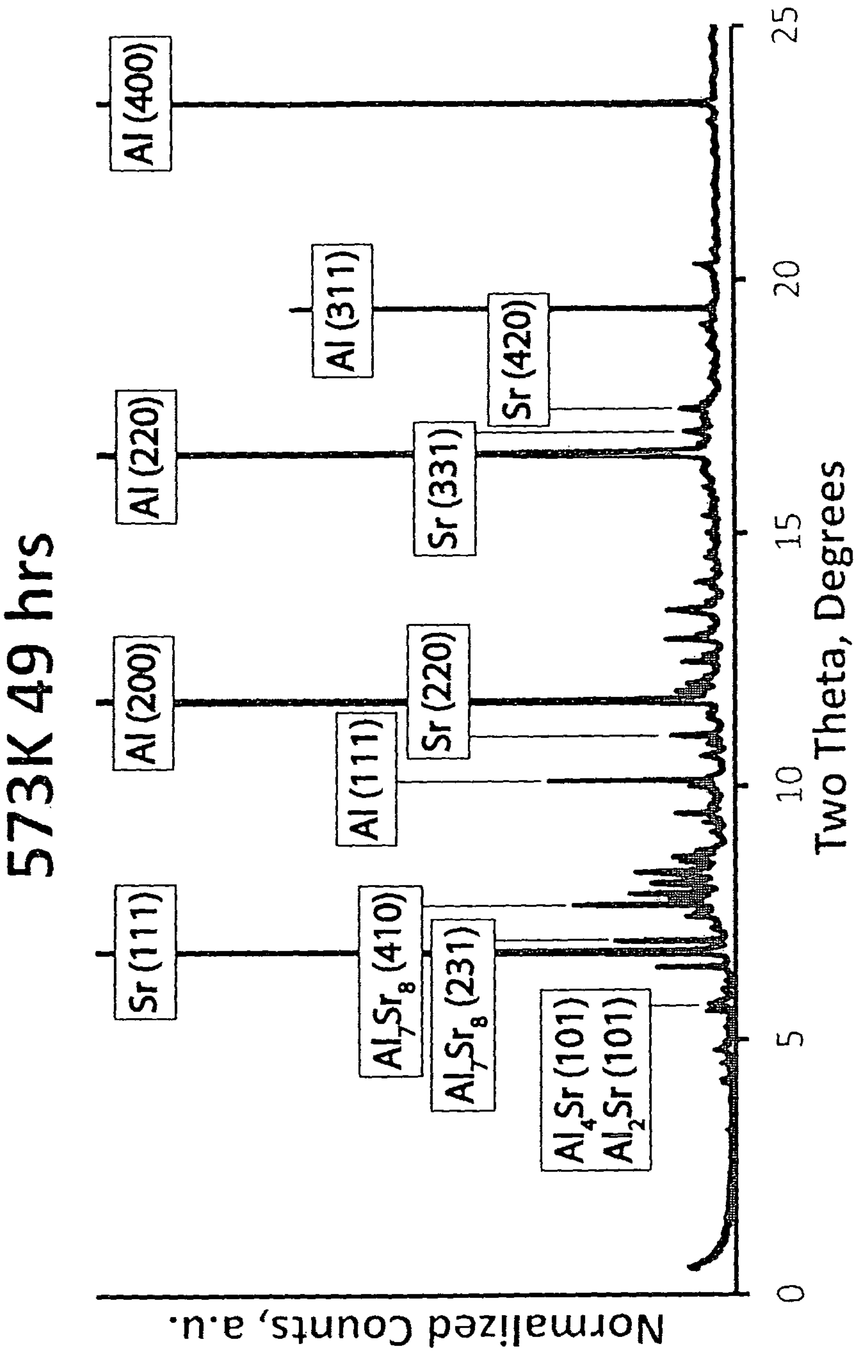
FIG. 30: shows zoomed XRD with labeled intermetallic compound peaks for 573K, 49 hour-treated sample.

X-Ray Diffraction:

Samples were selected across a range of processing temperatures and times for diffraction via synchrotron radiation at the Advanced Photon Source at Argonne National Laboratory. Each sample was approximately 1 cm long, and 1.1 mm in diameter. The wavelength used to diffract the Al—Sr samples was 0.412413 Å. The data obtained for counts were normalized such that the highest peak was assigned a value of 1 to allow relative peak comparisons. FIGS. 24-26 show the full-scale diffraction patterns generated. Inspection of these figures shows that the Al—Sr samples are heavily textured in their initial state, and subsequent heat treatments allow for reorientation of grains and modification to this texture. Since the largest volume percentage of the composite is pure Al, Al peaks dwarf all other phases' peaks. To adequately label peaks for plane/phase and compare intensities, the y-axis (normalized counts) was zoomed to make the smaller phase fractions more easily visible. No data were modified during this process; only the y-axis scaling was changed. FIGS. 27, 28, and 30 show the XRD (x-ray diffraction) plots that have been scaled so the y-axis is $1/20^{th}$ of the height of the maximum peak. Since the intensity of the strongest peaks is in the hundreds of thousands of counts, even $1/20^{th}$ of this number is in the tens of thousands of counts. Using *Pearson's Handbook of Crystallographic Data*, the peaks were identified and labeled. Some peaks overlapped with peaks from other phases or were unidentifiable. Due to the large number of peaks associated with the intermetallic compounds in this system, only peaks that could definitively be identified as one and only one phase were labeled and used for comparison.

Texture effects are clearly evident in these diffraction patterns. For example, the most common fiber texture in fcc crystals is a mix of <001> and <111>, so the low intensities of the (111) planes in the No HT specimen are consistent with a strong <111> fiber texture, which orients (111) planes so they have little diffraction intensity visible in diffraction patterns taken with the x-ray beam passing through the wire sample perpendicular to the wire centerline. The low intensity of the (200) plane in the No HT pattern suggests that the dominant texture is <111>, not <001>, because a <001> fiber texture would produce a strong (200) peak in the No HT sample. Once the annealing procedures began, this fiber texture was quickly lost, and the diffracted intensity of the (111) and (200) planes increased sharply. As the composite is deformed, texture will develop quickly, yet as the composite is exposed to elevated temperatures, the grains possess large dislocation densities that will aid in a quick transition to either an untextured state or to a new, recrystallization texture. The texture in Al is different from the texture in Sr. Al shows strong <111> texture as well, however, the high peak intensity of the (200) planes would suggest that the dominant texture is <001>. The low intensity of the (111) peak after a heat treatment at 573K for 49 hours suggests that the <111> fiber texture in Al has not decreased. However, this loss of texture for Sr in the samples corresponds to the increase and plateau of resistivity values around these heat treatment times.

In the 573K 49-hour sample (FIG. 30), the Sr (111) and (200) peaks have decreased considerably. Since there has been no mechanical deformation to reintroduce texture to the samples, the decrease in Sr peak intensities requires that a major decrease in pure Sr occurred within the composite between the 573K 1 hour and 49-hour samples. Few intermetallic peaks were observed prior to the 573K 49-hour sample, suggesting that the intermetallic formation occurred after the resistivity plateau and likely during the rapid resistivity increases near the inflection points of the curves. In addition, the primary peaks observed in the 573K 49-hour sample are those of the $Al_7Sr_8$ intermetallic system, yet peaks that can be attributed to the $Al_4Sr$ or $Al_2Sr$ systems were observed in the diffraction pattern also. The presence of these peaks at 573K 49 hours suggests that slow diffusion through the $Al_7Sr_8$ intermetallic is kinetically limiting the formation and growth of $Al_2Sr$ and $Al_4Sr$. Thus, it appears that there was relatively quick formation of $Al_7Sr_8$, followed by slow diffusion of Al into and through the intermetallic to allow growth and conversion to $Al_2Sr$ and $Al_4Sr$. The complex nature of ordered intermetallic diffusion and growth presumably slows the change from the kinetically favored intermetallic ($Al_7Sr_8$) to the thermodynamically favored intermetallic ($Al_4Sr$). The $Al_4Sr$ intermetallic phase is assumed to be the thermodynamically most stable compound due to its higher melting temperature compared to the other intermetallic phases in this system.

The results from the XRD analysis were consistent with results from resistivity measurements, SEM images, and DSC traces; confirming that the $Al_7Sr_8$ intermetallic did not cause the initial increase and plateau in the resistivity values. XRD analysis corroborated findings from previous tests proving that the microstructural change that has occurred during the large spike in resistivity is the formation of the $Al_7Sr_8$ intermetallic. The tests performed on this material demonstrated that this reaction was not complete after 49 hours at 573K, and that intermetallic compound formation and growth were still ongoing, albeit at a much slower rate than initially.

From the testing described above, the following have been determined for the Al—Sr system:

- Deformation processing may be used to produce an Al—Sr composite conductor wire for electric power transmission that has resistivity near the values of pure Al and that can be heat treated in-situ to form an intermetallic compound that may improve elevated temperature strength without substantially changing density.
- The activation energy for the formation of the $Al_7Sr_8$ intermetallic compound was calculated to be 108 kJ/mol. This value is likely low when compared to the activation energy for this reaction that might be determined by using diffusion couples due to the effects of dislocation pipeline diffusion and capillarity/surface energy.
- The initial plateau in resistivity is not caused by a microstructure change, but likely rather by recrystallization and removal of residual stress in both matrix and filaments, although applicants do not wish or intend to be bound by any theory or explanation. SEM images show negligible changes in filament thickness and phase percentages during this plateau while DSC measurements show that a large exothermic peak is decreasing in magnitude at this point. The time scale over which this plateau occurs is quick at elevated temperatures, yet longer than would be expected for simple annealing at these temperatures.
- The $Al_7Sr_8$ intermetallic compound forms fairly rapidly at temperatures greater than 523K, but $Al_7Sr_8$ forms quite slowly below this temperature. For applications operating at temperatures below 523K, the reaction to form the intermetallic compound happens on the order of hours to days, which suggests that an Al—Sr composite conductor could operate over wider temperature ranges than can conventional power transmission conductors.
- The whorl structure was observed in the transverse images for the Al—Sr system.
- Pure Sr is a metal with only moderate ductility. Tensile testing showed that the yield strength and elastic modulus of pure Sr are 80.1 MPa and 9.37 GPa at $6.5\times10^{-4}s^{-1}$ strain rate. The strain rate sensitivity of the Sr metal was measured to be 0.0369.

Applicants note that the data collected and interpreted above are subject to the following factors:

Resistivity measurements were taken at 293K in air with no humidity control. The measured value for pure Al was 4% higher than literature values. Resistivity values for the Al—Sr composite may vary by such an amount in addition to the error bars shown on plots.

The activation energy calculated by resistance measurements was done under the assumption that the sample that was heat treated at 573K for 49 hours was the completed reaction. However SEM, DSC, and XRD experiments show that this sample had not been completely reacted, but was still slowly reacting.

The oxide formation during polishing of samples for SEM imaging was quite rapid. The swelling and crumbling of the SrO that formed upon air exposure degraded the accuracy of the measurements of filament thickness and phase percentage. Unfortunately, samples oxidized at different rates, and they were exposed to room air for different lengths of time, resulting in a range of oxidation damage for Sr in the SEM images. During initial processing of the Sr to create 2 mm diameter wires, humidity was observed to have a large effect on the oxidation rate, yet no humidity control was possible during polishing.

To properly secure the wire samples for shipping for x-ray diffraction experiments, super glue was required around the base of the wire samples. The super glue was carefully applied to the interface between the sample wire and mounting base in order to avoid the beam interaction area. While it is hoped that this glue was not present in the beam interaction area, it must be noted as a possibility.

Tensile properties of the Al—Sr composite were not measured as part of the above testing.

With respect to Example 2, Applicants note that the Al wire and Sr wire method of this Example 2 has certain advantages over the previously described powder method of Example 1. First, it involves Ca or Sr wire, which has a lower surface: volume ratio vis-a-vis Ca or Sr powder and thus a lower risk of reaction with oxygen and possible fire or explosion. Second, it reduces the electrical resistivity of the resulting wire because the number of entrained oxide interfaces or particles that lie in the path of conducting electrons is drastically reduced. This is because the only oxides present in the starting materials lie at the Al—Al and Al-alkaline metal interfaces, all of which lie parallel to the extruded rod's centerline. Third, the position of the alkaline earth metal fibers in the extruded rod can be "managed" to develop any pattern that may be desired (e.g., more alkaline metal fibers near the center or near the outer surface of the rod. This allows design of graded microstructures that permit variation of strength, conductivity, and corrosion resistance along the radial dimension of the final drawn composite wire. Alternatively, the wire method also can utilize the alkaline metal component in the starting shape of a thin ribbon (about <0.2 mm thick or less) that is produced by melt spinning or flat rolling (probably in a "pack" configuration). This ribbon form of the Ca and/or Sr would provide an improved starting position for the deformation process, allowing less deformation to be used to achieve the desired composite spatial configuration.

The composites described herein are advantageous as high voltage power transmission conductors (e.g cables or wires) as a result of having the following characteristics:

High electrical conductivity
High tensile strength and good fracture toughness
Corrosion resistance
Low density
Good elevated temperature microstructure stability
Low cost Although the invention has been described with respect to certain embodiments thereof, those skilled in the art will appreciate that changes, modifications and the like can made thereto within the scope of the invention as set forth in the appended claims.

The invention claimed is:

1. A metal-metal composite having an electrically conducting matrix comprising aluminum and having elongated metal filaments comprising an alkaline earth metal selected from the group consisting of Ca, Sr, and Ba disposed in the matrix extending along a longitudinal axis of the composite.

2. The composite of claim 1 wherein the filaments are present in an amount of about 2 to about 40 volume %.

3. The composite of claim 1 wherein the filaments have a thickness dimension of 1 micron or less.

4. The composite of claim 1 having an intermetallic compound comprising aluminum and the alkaline earth metal present as a layer between the matrix and the filaments.

5. A metal-intermetallic composite having an electrically conducting matrix comprising aluminum and having elongated intermetallic compound filaments comprising Al and at least one of Ca, Sr, and Ba disposed in the matrix extending along a longitudinal axis of the composite.

6. The composite of claim 5, which is heat treated to form partially or fully the intermetallic compound comprising at least one of $Al_2Ca$, $Al_4Sr$, and $Al_4Ba$.

7. An electric power transmission conductor comprising a metal-metal composite having an electrically conducting matrix comprising aluminum and having elongated metal filaments comprising an alkaline earth metal selected from the group consisting of Ca, Sr, and Ba disposed in the matrix extending along a longitudinal axis of the composite.

8. The conductor of claim 7 wherein the filaments are present in an amount of about 2 to about 40 volume %.

9. The conductor of claim 7 wherein the filaments have a thickness dimension of 1 micron or less.

10. The conductor of claim 7 which is a cable or wire.

11. The conductor of claim 7 having an intermetallic compound comprising aluminum and the alkaline earth metal present as a layer between the matrix and the filaments.

12. An electric power transmission conductor comprising a metal-intermetallic composite having an electrically conducting matrix comprising aluminum and having elongated intermetallic compound filaments comprising Al and at least one of Ca, Sr, and Ba disposed in the matrix extending along a longitudinal axis of the composite.

13. The conductor of claim 12, which is heated to form the intermetallic compound comprising at least one of $Al_2Ca$, $Al_4Sr$, and $Al_4Ba$.

14. A method for making a metal-metal composite, comprising forming a mass having deformable components comprising Al and having deformable metal components comprising an alkaline earth metal selected from the group consisting of Ca, Sr, and Ba and mechanically co-deforming the components of the mass to form elongated metal filaments comprising the alkaline earth metal disposed in a matrix comprising Al and aligned along a longitudinal axis of the composite.

15. The method of claim 14 wherein the components comprising Al comprise powders, granules, wire lengths, and rod lengths.

16. The method of claim 14 wherein the components comprising alkaline earth metal comprise powders, granules, wire lengths, ribbon lengths, and rod lengths.

17. The method of claim 15 wherein the wire or rod lengths are stacked with their long axes aligned along a longitudinal axis of a container.

18. The method of claim 14 wherein the Ca, Sr and/or Ba components comprise about 2 to about 40 volume % of the mass.

19. The method of claim 14 wherein the mass is extruded.

20. The method of claim 19 including swaging and drawing after extruding.

21. The method of claim 14 including heating the composite to form an intermetallic compound comprising aluminum and the alkaline earth metal as a layer between the matrix and the filaments.

22. The method of claim 19 wherein the compound comprises at least one of $Al_2Ca$, $Al_4Sr$, and $Al_4Ba$.

23. A method for making an electric power transmission conductor, comprising forming a mass having deformable components comprising Al and having deformable metal components comprising an alkaline earth metal selected from the group consisting of Ca, Sr, and Ba and mechanically co-deforming the components of the mass to form elongated metal filaments comprising the alkaline earth metal disposed in a matrix comprising Al and aligned along a longitudinal axis of the deformed mass.

24. The method of claim 23 wherein the components comprising Al comprise powders, granules, wire lengths, and rod lengths.

25. The method of claim 23 wherein the components comprising alkaline earth metal comprise powders, granules, wire lengths, ribbon lengths, and rod lengths.

26. The method of claim 23 wherein the Ca, Sr and/or Ba components comprise about 2 to about 40 volume % of the mass.

27. The method of claim 23 wherein the mass is extruded.

28. The method of claim 27 including drawing after extruding.

29. The method of claim 28 wherein drawing is conducted with the deformed mass residing in a deformed container in which the mass was codeformed.

30. The method of claim 29 that makes a drawn cable or wire within the deformed container.

31. The method of claim 28 that makes a drawn cable or wire.

32. The method of claim 23 including heating the conductor to form an intermetallic compound.

33. The method of claim 32 wherein the compound comprises $Al_2Ca$, $Al_4Sr$ and/or $Al_4Ba$.

34. The method of claim 32 wherein the conductor is heated by Joule heating during electrical power transmission service to form the intermetallic compound that comprises aluminum and the alkaline earth metal as a layer between the matrix and the filaments.

35. The method of claim 23 that makes a cable or wire.

* * * * *

UNITED STATES PATENT AND TRADEMARK OFFICE

CERTIFICATE OF CORRECTION

PATENT NO. : 8,647,536 B2
APPLICATION NO. : 13/136599
DATED : February 11, 2014
INVENTOR(S) : Alan M. Russell et al.

It is certified that error appears in the above-identified patent and that said Letters Patent is hereby corrected as shown below:

On the Title Page item (75) should read:

Inventors: Alan M. Russell, Ames, IA (US); Iver E. Anderson, Ames, IA (US); Hyong J. Kim, Ames, IA (US); Andrew E. Frerichs, Ames, IA (US)

Signed and Sealed this
First Day of July, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,647,536 B2
APPLICATION NO. : 13/136599
DATED : February 11, 2014
INVENTOR(S) : Allan M. Russell et al.

It is certified that error appears in the above-identified patent and that said Letters Patent is hereby corrected as shown below:

<u>Title Page,</u>

Item [75], Inventors, "Alan M. Russell, Ames, IA (US); Iver E. Anderson, Ames, IA (US); Hyong J. Kim, Ames, IA (US); Andrew E. Frerichs, Ames, IA (US)" (as corrected to read in the Certificate of Correction issued July 1, 2014) is deleted and patent is returned to its original state with fourth inventor name in patent to read -- Alan M. Russell, Ames, IA (US); Iver E. Anderson, Ames, IA (US); Hyong J. Kim, Ames, IA (US); Andrew E. Freichs, Ames, IA (US) --.

Signed and Sealed this
Thirtieth Day of September, 2014

Michelle K. Lee

Michelle K. Lee
*Deputy Director of the United States Patent and Trademark Office*